(12) United States Patent
Faber et al.

(10) Patent No.: US 9,202,220 B2
(45) Date of Patent: *Dec. 1, 2015

(54) METHODS AND APPARATUSES TO PROVIDE APPLICATION PROGRAMMING INTERFACE FOR RETRIEVING PAY PER CALL ADVERTISEMENTS

(75) Inventors: Scott Faber, San Francisco, CA (US); Virginia Hong-Jia Yang, Foster City, CA (US); Ebbe Altberg, Mill Valley, CA (US); Mark Halstead, Ackland (NZ); Amit Akhouri, Fremont, CA (US); Katherine Maureen Slemmer, Oakland, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 1862 days.

This patent is subject to a terminal disclaimer.

(21) Appl. No.: 11/563,464

(22) Filed: Nov. 27, 2006

(65) Prior Publication Data

US 2007/0143182 A1   Jun. 21, 2007

Related U.S. Application Data

(60) Provisional application No. 60/862,719, filed on Oct. 24, 2006.

(51) Int. Cl.
  *G06Q 30/00* (2012.01)
  *G06Q 30/02* (2012.01)
  (Continued)

(52) U.S. Cl.
  CPC ............ *G06Q 30/02* (2013.01); *G06Q 30/0242* (2013.01); *G06Q 30/0244* (2013.01);
  (Continued)

(58) Field of Classification Search
  CPC . H04M 15/00; H04M 3/4931; H04M 3/4878; G06Q 30/02; G06Q 30/0275; G06Q 30/0273; G06Q 30/0241; G06Q 30/0242; G06Q 30/0244; G06Q 30/0256; G06Q 30/0257; G06Q 30/0277
  USPC ............ 705/14.71, 14.69, 14.4, 14.41, 14.43, 705/14.54, 14.55, 14.73; 379/114.13, 379/114.01
  See application file for complete search history.

(56) References Cited

U.S. PATENT DOCUMENTS

| | | |
|---|---|---|
| 4,604,686 A | 8/1986 | Reiter et al. |
| 4,653,090 A | 3/1987 | Hayden |

(Continued)

FOREIGN PATENT DOCUMENTS

| | | |
|---|---|---|
| KR | 20010086595 | 9/2001 |
| WO | 02088880 | 11/2002 |

(Continued)

OTHER PUBLICATIONS

International Application No. PCT/US04/15238, Written Opinion and International Search Report, Aug. 29, 2005.

(Continued)

*Primary Examiner* — Raquel Alvarez
(74) *Attorney, Agent, or Firm* — Alston & Bird LLC

(57) ABSTRACT

Methods and apparatuses to provide access to advertisement database through an application programming interface. One embodiment includes receiving a request according to an application program interface over a network connection; and in response to the request, providing at least a portion of an advertisement according to the application programming interface. The advertisement is designed to generate communication leads for a party; and the party is to be charged for the advertisement according to a count of communication leads generated for the party via the advertisement.

14 Claims, 27 Drawing Sheets

(51) Int. Cl.
*H04M 3/493* (2006.01)
*H04M 15/00* (2006.01)
*H04M 3/487* (2006.01)

(52) U.S. Cl.
CPC ........ *G06Q30/0256* (2013.01); *G06Q 30/0257* (2013.01); *G06Q 30/0273* (2013.01); *G06Q 30/0275* (2013.01); *G06Q 30/0277* (2013.01); *H04M 3/4878* (2013.01); *H04M 3/4931* (2013.01); *H04M 15/00* (2013.01)

(56) References Cited

U.S. PATENT DOCUMENTS

| | | |
|---|---|---|
| 4,677,659 A | 6/1987 | Dargan |
| 4,757,267 A | 7/1988 | Riskin |
| 4,788,718 A | 11/1988 | McNabb et al. |
| 4,817,129 A | 3/1989 | Riskin |
| 4,847,890 A | 7/1989 | Solomon et al. |
| 5,058,152 A | 10/1991 | Solomon et al. |
| 5,319,542 A | 6/1994 | King, Jr. et al. |
| 5,339,358 A | 8/1994 | Danish et al. |
| 5,359,508 A | 10/1994 | Rossides |
| 5,469,497 A | 11/1995 | Pierce et al. |
| 5,574,780 A | 11/1996 | Andruska et al. |
| 5,596,634 A | 1/1997 | Fernandez et al. |
| 5,602,905 A | 2/1997 | Mettke |
| 5,615,213 A | 3/1997 | Griefer |
| 5,659,742 A | 8/1997 | Beattie et al. |
| 5,694,549 A | 12/1997 | Carlin et al. |
| 5,781,894 A | 7/1998 | Petrecca et al. |
| 5,794,210 A | 8/1998 | Goldhaber et al. |
| 5,802,502 A | 9/1998 | Gell et al. |
| 5,819,092 A | 10/1998 | Ferguson et al. |
| 5,862,223 A | 1/1999 | Walker et al. |
| 5,884,032 A | 3/1999 | Bateman et al. |
| 5,901,214 A | 5/1999 | Shaffer et al. |
| 5,914,951 A | 6/1999 | Bentley et al. |
| 5,940,471 A | 8/1999 | Homayoun |
| 5,943,416 A | 8/1999 | Gisby |
| 5,960,416 A | 9/1999 | Block |
| 5,982,863 A | 11/1999 | Smiley et al. |
| 5,987,118 A | 11/1999 | Dickerman et al. |
| 5,999,611 A | 12/1999 | Tatchell et al. |
| 6,028,601 A | 2/2000 | Machiraju et al. |
| 6,055,513 A | 4/2000 | Katz et al. |
| 6,108,493 A | 8/2000 | Miller et al. |
| 6,167,449 A | 12/2000 | Arnold et al. |
| 6,173,279 B1 | 1/2001 | Levin et al. |
| 6,188,761 B1 | 2/2001 | Dickerman et al. |
| 6,269,336 B1 | 7/2001 | Ladd et al. |
| 6,292,799 B1 | 9/2001 | Peek et al. |
| 6,314,402 B1 | 11/2001 | Monaco et al. |
| 6,323,894 B1 | 11/2001 | Katz |
| 6,381,325 B1 | 4/2002 | Hanson |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,418,214 B1 | 7/2002 | Smythe et al. |
| 6,430,276 B1 | 8/2002 | Bouvier et al. |
| 6,434,527 B1 | 8/2002 | Horvitz |
| 6,460,036 B1 | 10/2002 | Herz |
| 6,461,162 B1 | 10/2002 | Reitman et al. |
| 6,470,317 B1 | 10/2002 | Ladd et al. |
| 6,493,671 B1 | 12/2002 | Ladd et al. |
| 6,493,673 B1 | 12/2002 | Ladd et al. |
| 6,504,920 B1 | 1/2003 | Okon et al. |
| 6,513,013 B1 | 1/2003 | Stephanou |
| 6,539,359 B1 | 3/2003 | Ladd et al. |
| 6,570,870 B1 | 5/2003 | Berstis |
| 6,625,595 B1 | 9/2003 | Anderson et al. |
| 6,636,590 B1 | 10/2003 | Jacob et al. |
| 6,658,389 B1 | 12/2003 | Alpdemir |
| 6,691,093 B2 | 2/2004 | Shell |
| 6,704,403 B2 | 3/2004 | Lurie et al. |
| 6,732,183 B1 | 5/2004 | Graham |
| 6,735,588 B2 | 5/2004 | Kim et al. |
| 6,757,364 B2 | 6/2004 | Newkirk |
| 6,807,571 B2 | 10/2004 | Hatano et al. |
| 6,836,225 B2 | 12/2004 | Lee et al. |
| 6,839,737 B1 | 1/2005 | Friskel |
| 6,910,035 B2 | 6/2005 | Hoekman et al. |
| 7,013,280 B2 | 3/2006 | Davis et al. |
| 7,035,468 B2 | 4/2006 | Yogeshwar et al. |
| 7,092,091 B2 | 8/2006 | Itoh et al. |
| 7,340,048 B2 | 3/2008 | Stern et al. |
| 7,428,497 B2 | 9/2008 | Agarwal et al. |
| 7,475,149 B2 | 1/2009 | Jacob et al. |
| 7,505,920 B2 | 3/2009 | Agarwal et al. |
| 7,876,886 B2 | 1/2011 | Altberg et al. |
| 7,995,723 B2 | 8/2011 | Jacob et al. |
| 8,027,878 B2 | 9/2011 | Wong et al. |
| 8,209,225 B2 | 6/2012 | Altberg et al. |
| 8,244,584 B1 * | 8/2012 | O'Shea et al. ............. 705/14.41 |
| 8,468,050 B2 | 6/2013 | Faber et al. |
| 8,521,596 B2 | 8/2013 | Altberg et al. |
| 2001/0029482 A1 | 10/2001 | Tealdi et al. |
| 2002/0069105 A1 | 6/2002 | do Rosario Botelho et al. |
| 2002/0116256 A1 | 8/2002 | De Rafael et al. |
| 2002/0116266 A1 | 8/2002 | Marshall |
| 2002/0120554 A1 | 8/2002 | Vega |
| 2002/0133402 A1 | 9/2002 | Faber et al. |
| 2002/0191762 A1 | 12/2002 | Benson |
| 2003/0046198 A1 | 3/2003 | Knapp et al. |
| 2003/0191693 A1 | 10/2003 | Aphek |
| 2003/0220866 A1 * | 11/2003 | Pisaris-Henderson et al. . 705/37 |
| 2004/0103024 A1 | 5/2004 | Patel et al. |
| 2004/0193740 A1 | 9/2004 | Kasmirsky et al. |
| 2004/0196833 A1 | 10/2004 | Dahan et al. |
| 2004/0199494 A1 | 10/2004 | Bhatt |
| 2004/0249709 A1 * | 12/2004 | Donovan et al. ................. 705/14 |
| 2005/0074102 A1 | 4/2005 | Altberg et al. |
| 2005/0114208 A1 | 5/2005 | Arbuckle et al. |
| 2005/0216345 A1 | 9/2005 | Altberg et al. |
| 2007/0070980 A1 | 3/2007 | Phelps et al. |
| 2007/0100799 A1 | 5/2007 | Rose et al. |
| 2007/0116217 A1 | 5/2007 | Altberg et al. |
| 2008/0187114 A1 | 8/2008 | Altberg et al. |
| 2009/0060148 A1 | 3/2009 | Jacob et al. |
| 2009/0067599 A1 | 3/2009 | Agarwal et al. |
| 2011/0137754 A1 | 6/2011 | Fernandez |
| 2013/0012158 A1 | 1/2013 | Altberg et al. |
| 2013/0103503 A1 | 4/2013 | Zhang et al. |
| 2013/0311261 A1 | 11/2013 | Faber et al. |
| 2013/0325635 A1 | 12/2013 | Altberg et al. |

FOREIGN PATENT DOCUMENTS

| | | |
|---|---|---|
| WO | 2005040962 | 5/2005 |
| WO | 2005101269 | 10/2005 |
| WO | 2005109287 | 11/2005 |
| WO | 2005109288 | 11/2005 |

OTHER PUBLICATIONS

USPTO Transaction History of U.S. Appl. No. 10/679,982, filed Oct. 6, 2003, entitled "Method and Apparatus to Provide Pay-Per-Call Performance Based Advertising," now U.S. Pat. No. 7,120,235.

USPTO Transaction History of U.S. Appl. No. 10/956,571, filed Oct. 1, 2004, entitled "Method and System to Connect Consumers to Information."

USPTO Transaction History of U.S. Appl. No. 10/956,771, filed Oct. 1, 2004, entitled "Method and System to Connect Consumers to Information," now U.S. Pat. No. 7,224,781.

USPTO Transaction History of U.S. Appl. No. 11/077,655, filed Mar. 10, 2005, entitled "Methods and Apparatuses for Pay-Per-Call Advertising in Mobile/Wireless Applications," now U.S. Pat. No. 7,428,497.

USPTO Transaction History of U.S. Appl. No. 11/092,309, filed Mar. 28, 2005, entitled "Methods and Apparatuses for Offline Selection of Pay-Per-Call Advertisers," now U.S. Pat. No. 7,366,683.

(56) References Cited

OTHER PUBLICATIONS

USPTO Transaction History of U.S. Appl. No. 11/556,663, filed Nov. 3, 2006, entitled "Methods and Apparatuses to Provide Application Programming Interface for Managing Pay Per Call Advertisements."
USPTO Transaction History of U.S. Appl. No. 11/691,372, filed Mar. 26, 2007, entitled "Methods and Systems to Connect Consumers to Information."
USPTO Transaction History of U.S. Appl. No. 12/240,807, filed Sep. 29, 2008, entitled "Methods and Systems to Connect Consumers to Information."
EP Application No. 05745704.6, Examination Report, Feb. 1, 2010.
EP Application No. 05745756.6, Examination Report, Jan. 28, 2010.
International Application No. PCT/US05/15645, Written Opinion and International Search Report, Feb. 5, 2007.
International Application No. PCT/US05/15646, Written Opinion and International Search Report, Jan. 29, 2007.
"Keen.com raises $60 Million from Prestigious Investors and Strategic Partners Just 60 Days After Launch of Its Live Answer Community," Business Wire, Jan. 11, 2000.
"Sell and Buy Advice Online," The Ottawa Citizen, p. D7, Nov. 29, 1999.
CCBN, Inc. "Full Year 2003 and Q4 Ebookers PLC Earnings Conference Call—Part 2," Fair Disclosure Wire, Mar. 22, 2004.
Clark, Don, "Keen.com Plans Web Service Allowing Customers to Hold Private Phone Chats," Wall Street Journal, Nov. 8, 1999.
Ingenio, Inc., "Keen: Your Personal Advisor," retrieved from http://www.keen.com, available at least by Feb. 4, 2006.
International Application No. PCT/US05/12061, Written Opinion and International Search Report, Nov. 17, 2006.
International Application No. PCT/US01/48284, International Preliminary Examination Report, Aug. 9, 2002.
International Application No. PCT/US01/48284, International Search Report, May 13, 2002.
Rose, D.E. et al., "Understanding User Goals in Web Search," Proceedings of the 13th Int'l Conference on World Wide Web, pp. 13-19, May 17-20, 2004.

* cited by examiner

FUNCTIONAL DESCRIPTION OF SYSTEM

— 114

SCROLL DOWN to see more listings    Refine your search by Zip Code:

Your search found 105 listings, Listings 1 to 15 listed below ...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS    scroll down for more listings

Dream Car Rentals                         Cite Gold
3734 Las Vegas Blvd.
LAS VEGAS, NV
Phone: (702) 555-6661
Fax: (702) 555-6665
We Specialize in Excitement! Ferrari's. Viper's Porsche's & Hummers. Harley-Davidson's and SUV's "DRIVE THE DREAM"

Cite Gold

RENT-A-VETTE
5021 SWENSON STREET
LAS VEGAS, NV 89119
Phone: (702) 555-2692
Fax: (702) 555-2044

ONLINE LISTINGS    scroll down for more listings

Expedia: For All Your Car Rental Needs  http://www.expedia.com
Save with Expedia.com, your one-stop source for flights, hotels, vacation packages, cruises, and rental

FIG. 9

METHODS AND APPARATUSES TO PROVIDE APPLICATION PROGRAMMING INTERFACE FOR RETRIEVING PAY PER CALL ADVERTISEMENTS

The present application claims priority to Provisional U.S. Patent Application Ser. No. 60/862,719, filed Oct. 24, 2006, the disclosure of which is incorporated herein by reference.

The present patent application is related to: U.S. patent application Ser. No. 11/077,655, filed Mar. 10, 2005 and claimed priority from Provisional U.S. Patent Application 60/653,708 filed on Feb. 16, 2005, Provisional U.S. Patent Application Ser. No. 60/568,156 filed on May 4, 2004, Provisional U.S. Patent Application Ser. No. 60/560,926 filed on Apr. 9, 2004 and Provisional U.S. Patent Application Ser. No. 60/552,124 filed on Mar. 10, 2004; U.S. patent application Ser. No. 11/092,309, filed Mar. 28, 2005 and claimed priority from Provisional U.S. Patent Application 60/653,660 filed on Feb. 16, 2005; U.S. patent application Ser. No. 11/095,853, filed Mar. 30, 2005 and claimed priority from Provisional U.S. Patent Application 60/653,661 filed on Feb. 16, 2005; U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; U.S. patent application Ser. No. 10/679,982, filed Oct. 6, 2003; and Provisional U.S. Patent Application No. 60/761,950, filed Jan. 24, 2006 The disclosures of the above referenced related applications are incorporated herein by reference.

TECHNOLOGY FIELD

At least some embodiments of the present invention relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

SUMMARY OF THE DESCRIPTION

Methods and apparatuses to provide access to advertisement database through an application programming interface are described here. Some embodiments are summarized in this section.

One embodiment includes receiving a request according to an application program interface over a network connection; and in response to the request, providing at least a portion of an advertisement according to the application programming interface. The advertisement is designed to generate communication leads for a party; and the party is to be charged for the advertisement according to a count of communication leads generated for the party via the advertisement.

The present disclosure includes methods and apparatuses which perform these methods, including data processing systems which perform these methods, and computer readable media which when executed on data processing systems cause the systems to perform these methods.

Other features will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

FIG. 9 shows an example of a search engine result page, which includes an advertisement generated, in accordance with one embodiment of the present invention.

DETAILED DESCRIPTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
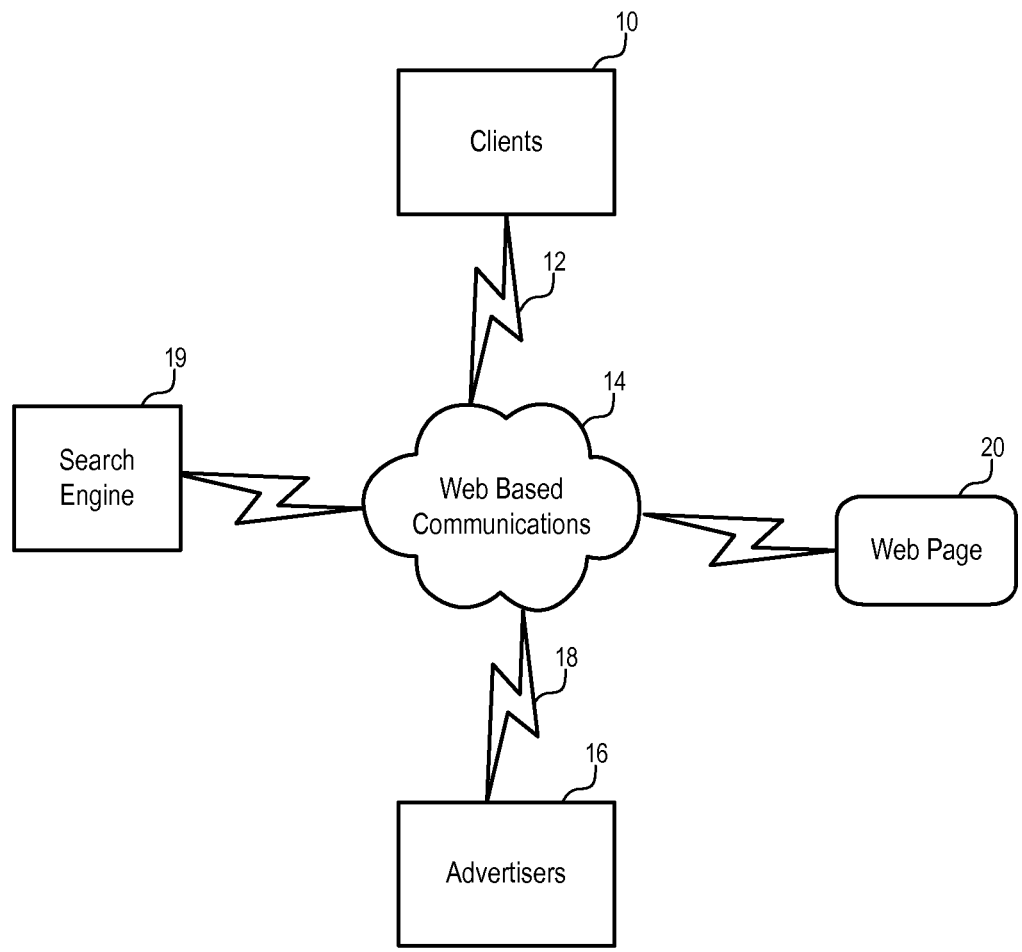
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
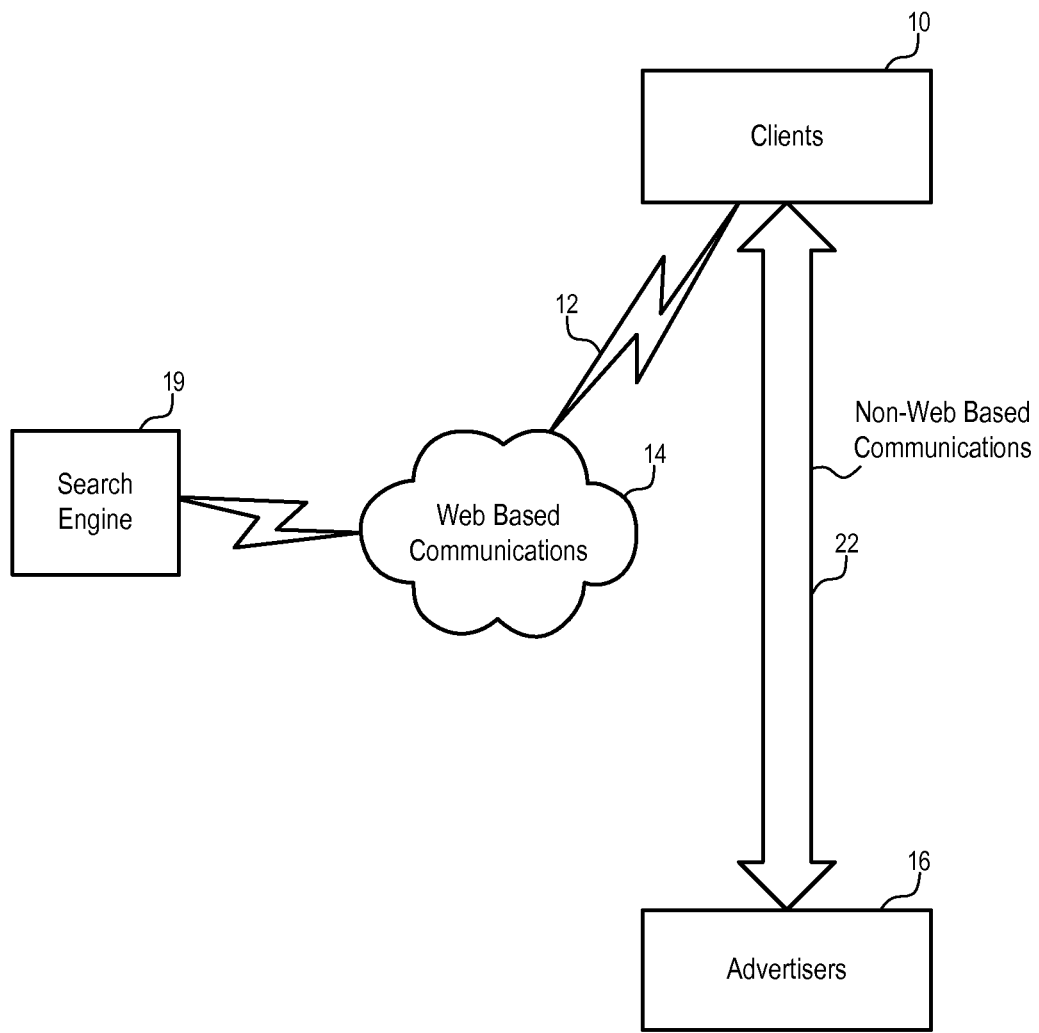
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, VoIP clients, etc.

Figure 3:
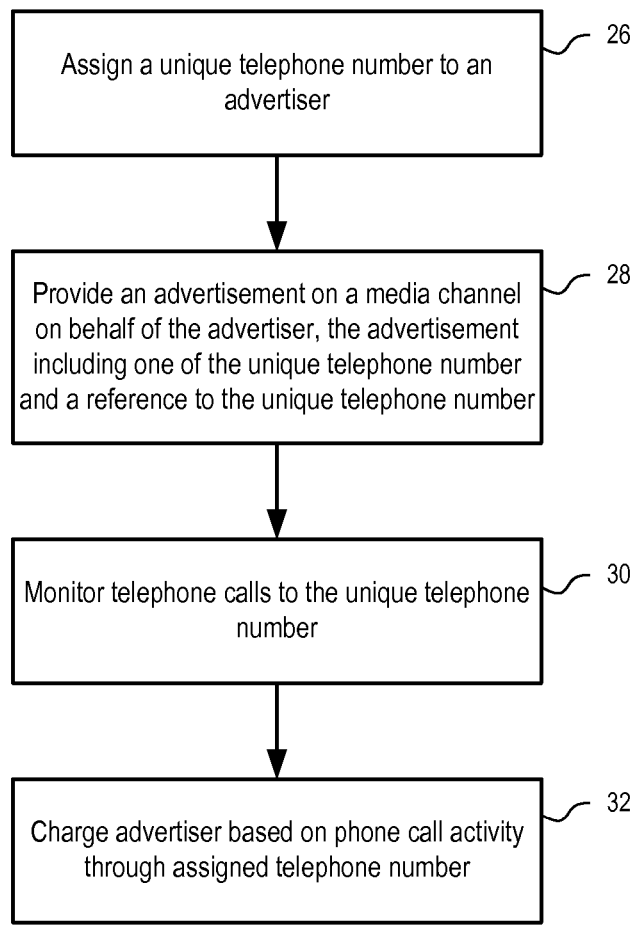
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
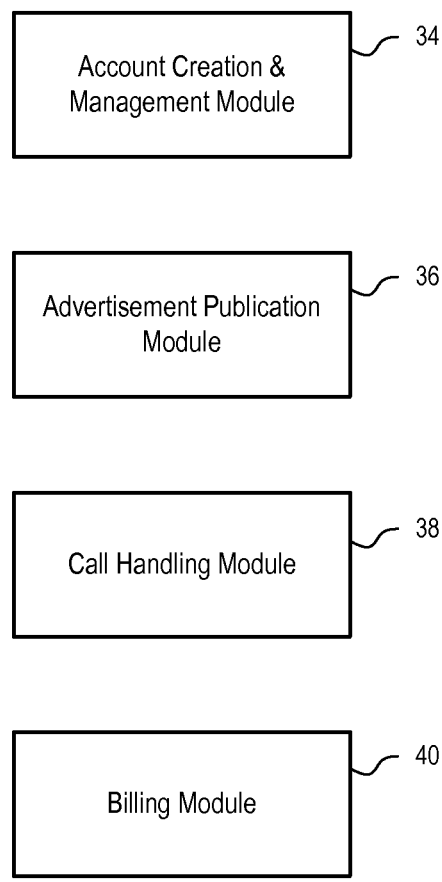
FIG. 4 shows a high level functional description of a system in accordance with one embodiment of the present invention.

FIG. 4 of the drawings shows a functional description of a system to implement the method of FIG. 3. Referring to FIG. 4, the system includes account creation and management module 34, advertisement publication module 36, call handling module 38, and billing module 40. In alternative embodiments, additional, less, or different modules may be included in the system without departing from the invention.

Figure 5:
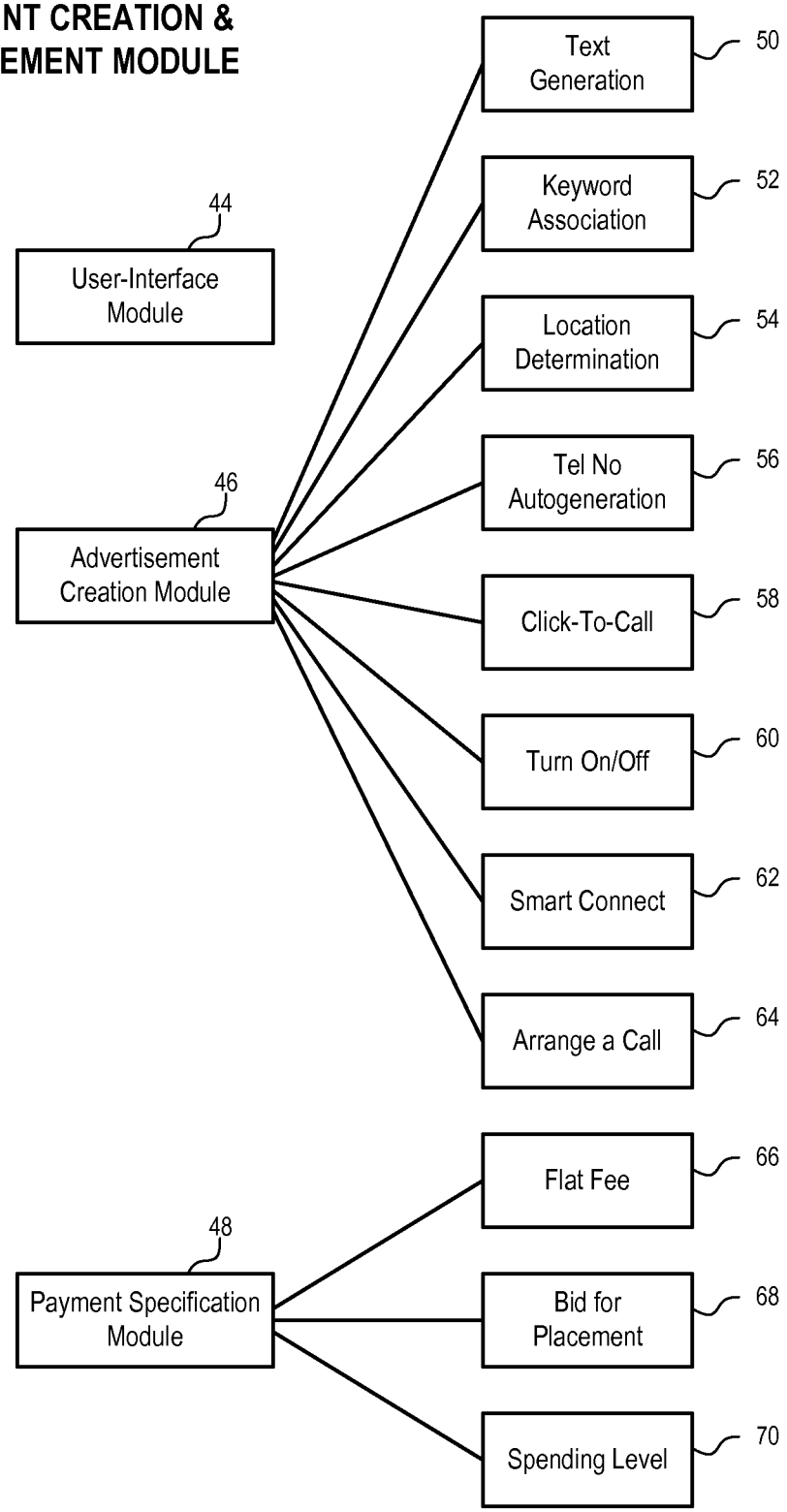
FIG. 5 illustrates the Account Creation and Management module of the system, in greater detail.
Figure 8A:
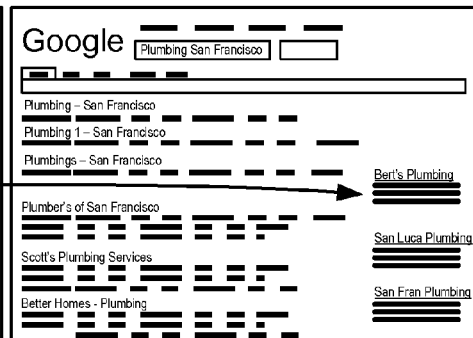
FIG. 8A shows an example of a user interface that may be presented to a user during advertisement creation, in accordance with one embodiment of the present invention.
Figure 8B:
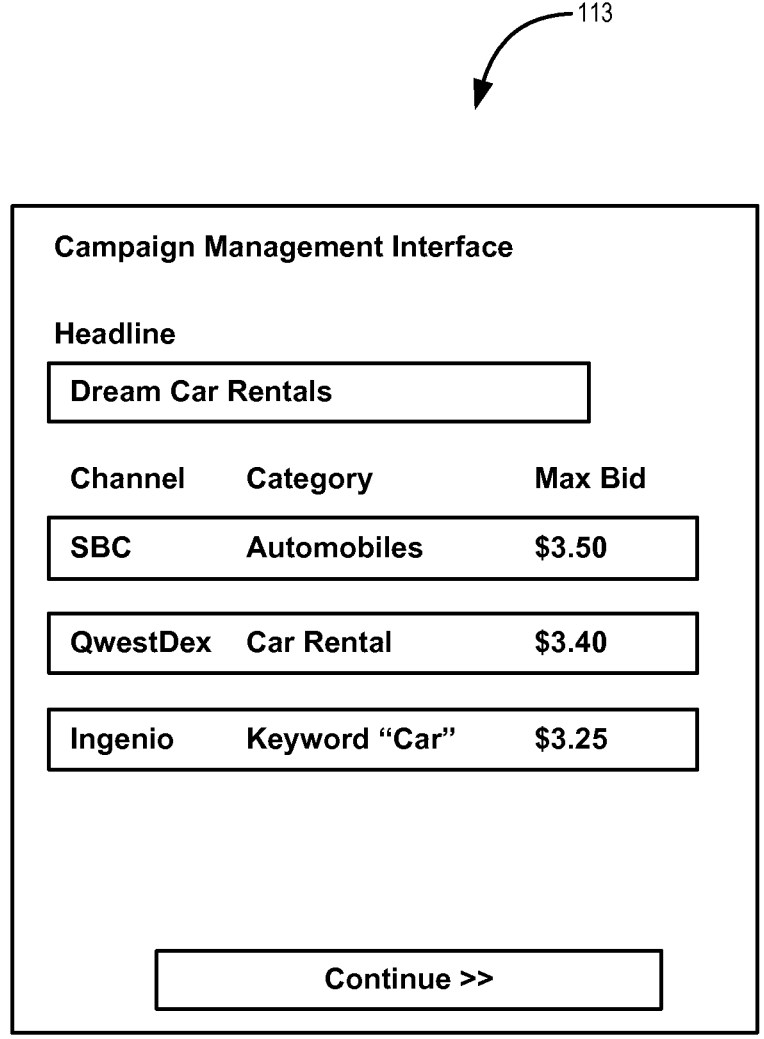
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or may not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will be displayed to clients searching within the San Francisco area.

In one embodiment, the module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number is generated or selected from a pool of numbers at the time the advertisement is created; alternatively, the telephone number is generated or selected at the time the advertisement is being requested for display. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1 800 YEL PAGES-1234, the call will be automatically routed to Burt's telephone as will be described in more detail below.

In one embodiment, the telephone number (e.g., a traditional telephone number with or without an extension, or a VoIP-based telephone reference, such as a Session Initiation Protocol (SIP) address) is automatically generated or selected at the time the advertisement is being requested for display. Alternatively, the telephone number assigned to the advertiser is generated or selected at the time the system accepts the submission of the advertisement from the advertiser. Alternatively, the telephone number assigned to the advertiser is generated or selected at the time the advertisement is being activated for publication via the system.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then tries cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory, or keyword. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account. Alternatively, Burt may provide payment information (e.g., a credit card number or bank account) to the system such that the system can automatically transfer additional funds, when needed, to his account according to the payment information.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the system.

Figure 6:
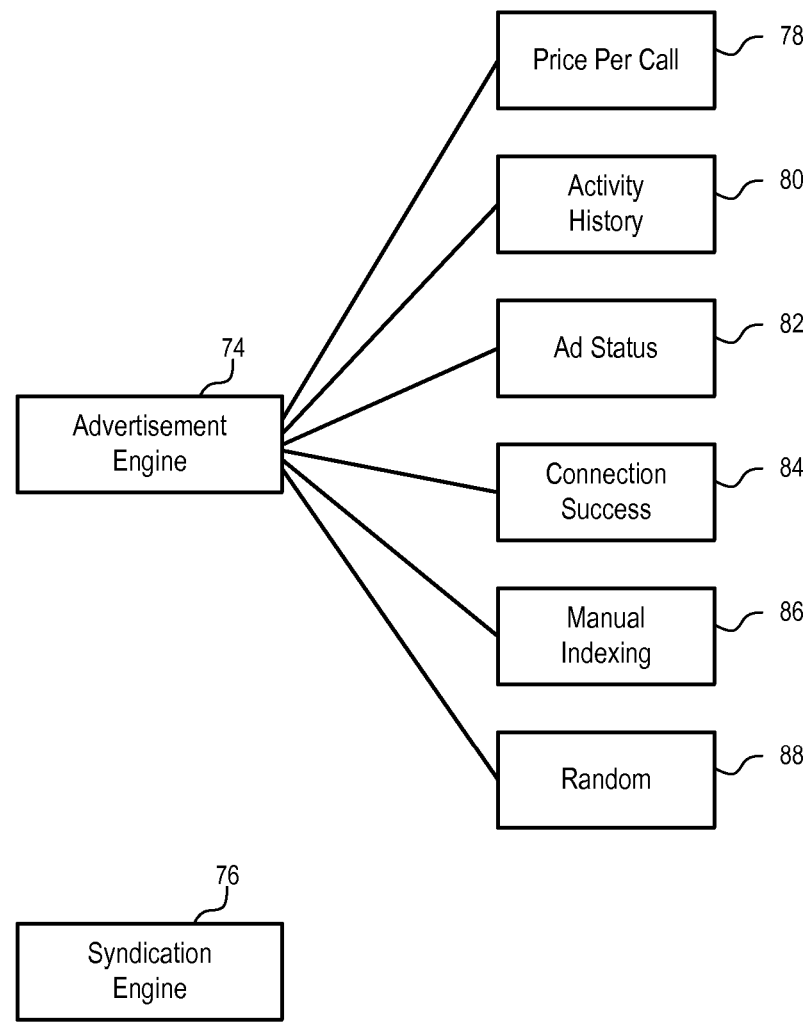
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement engine 74, and an advertisement syndication engine 76. The purpose of the advertisement engine 74 is to automatically provide Burt's advertisement on a particular channel. In some embodiments, the advertisement engine 74 causes a campaign management interface 113 (see FIG. 8B of the drawings) to be displayed to an advertiser. The interface 113 allows the advertiser to optionally choose a channel, e.g., Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately provided. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement engine 74 without departing from the invention.

In one embodiment, an advertisement engine 74 further includes one or more modules for searching advertisements according to a query request, sorting advertisements, allocating real time communication references (e.g., traditional telephone numbers, SIP address, user ID of instant messaging system, etc.).

Figure 7:
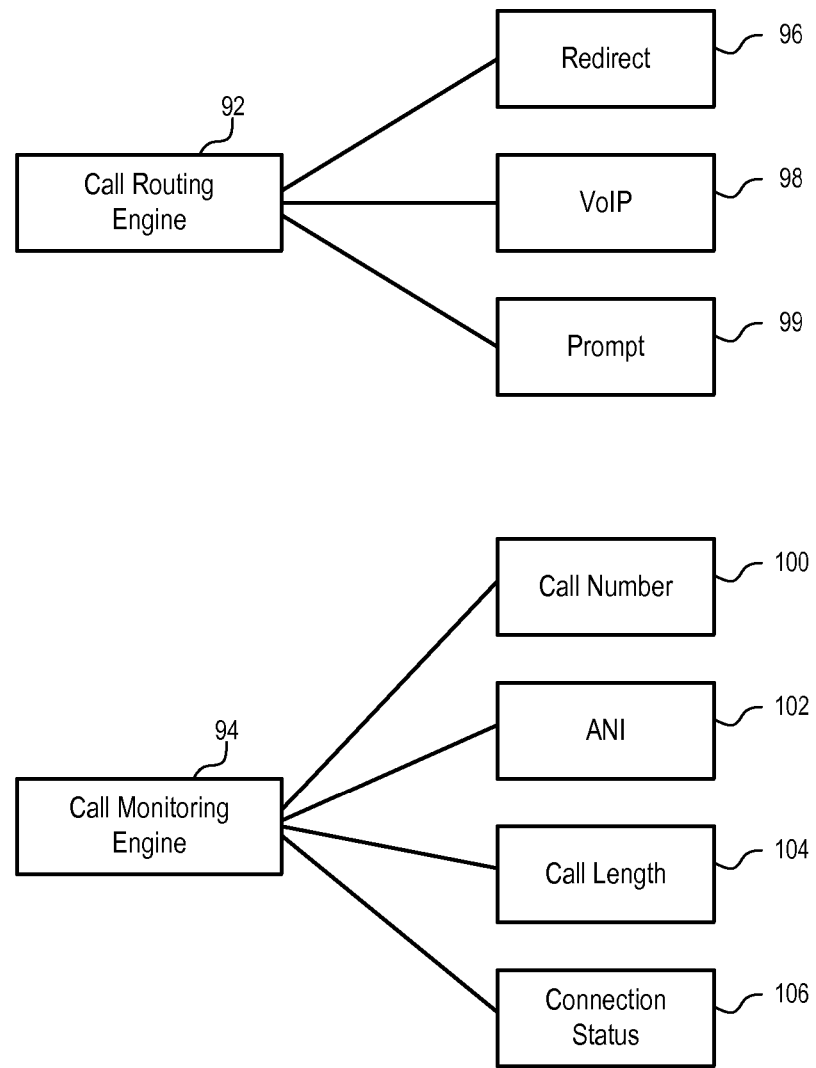
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
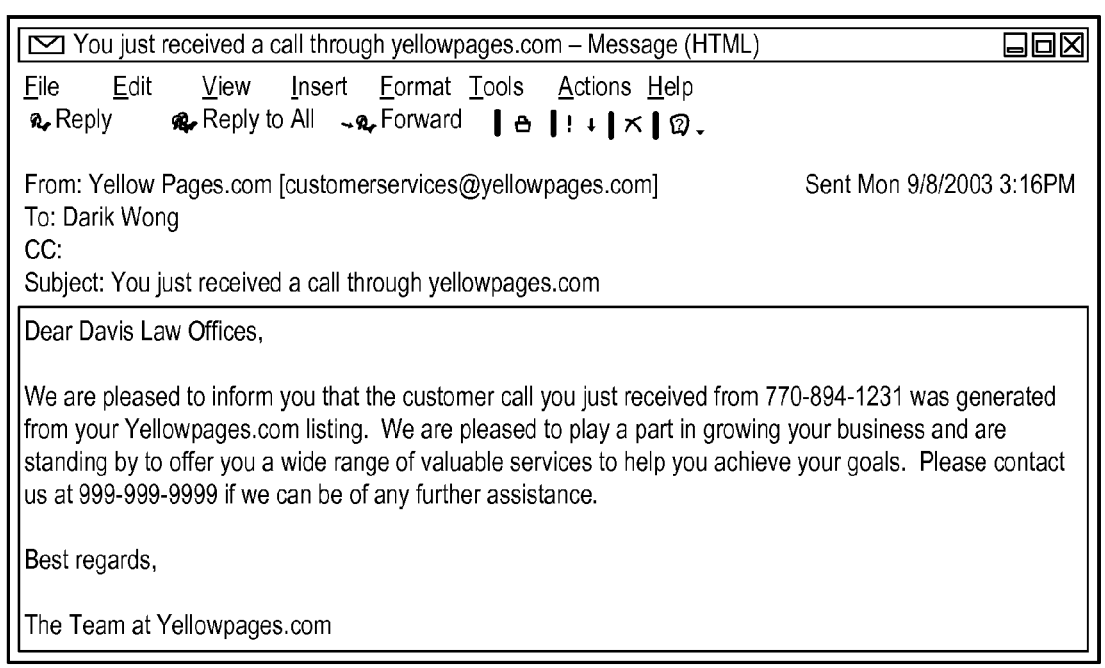
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100 106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
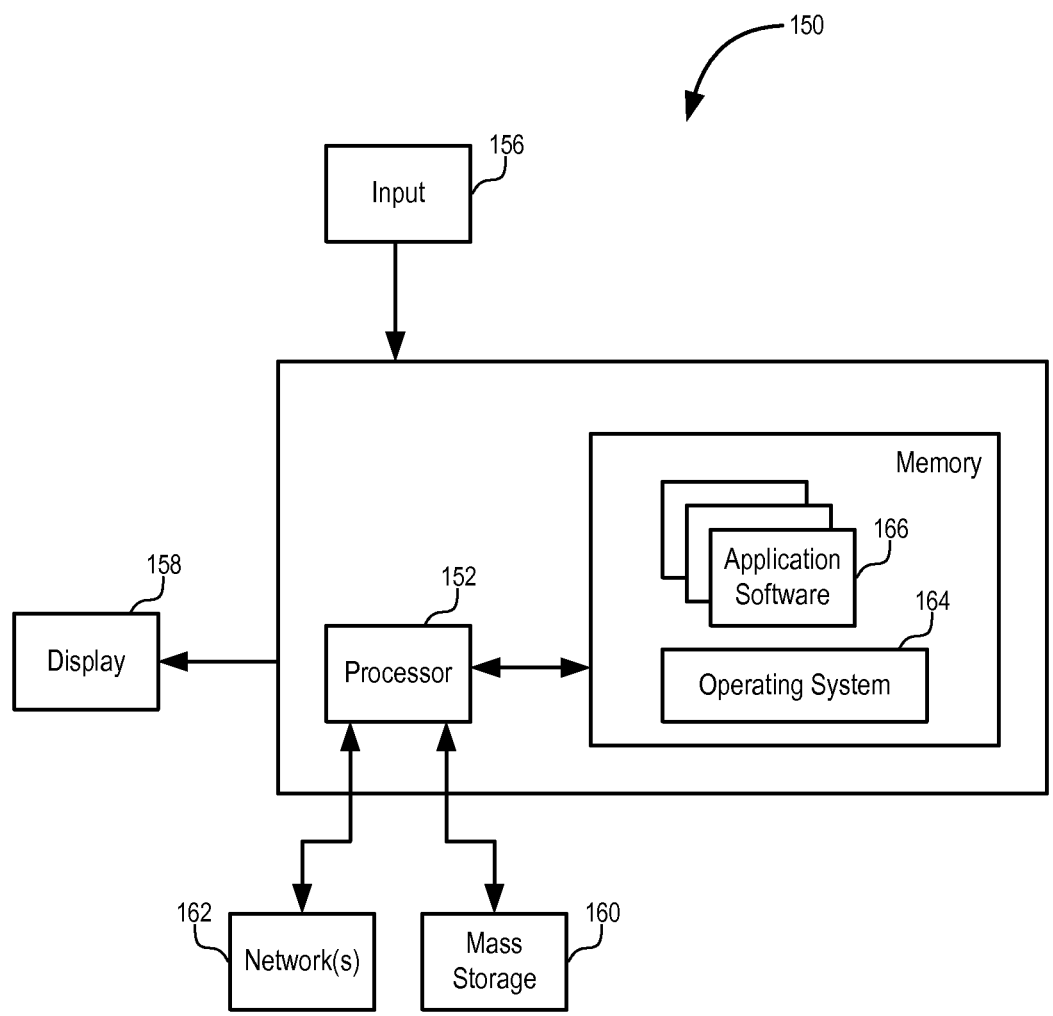
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to the memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or back-up memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. These demand partners (also referred to herein as syndication partners) can receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
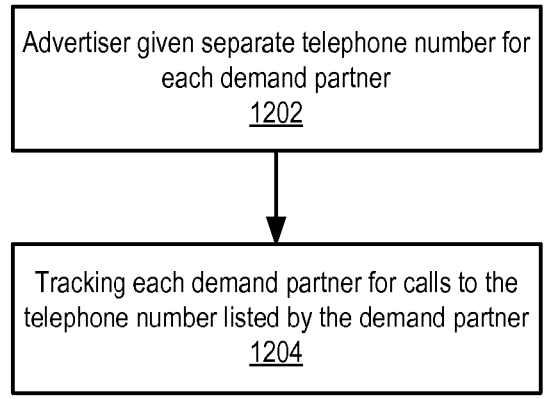
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
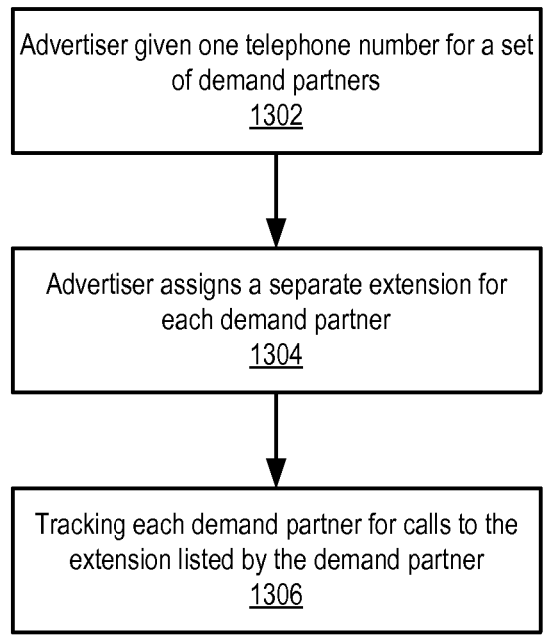

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
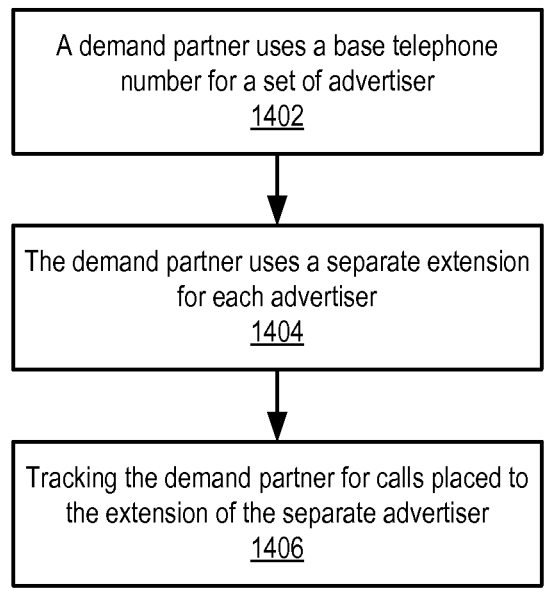

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
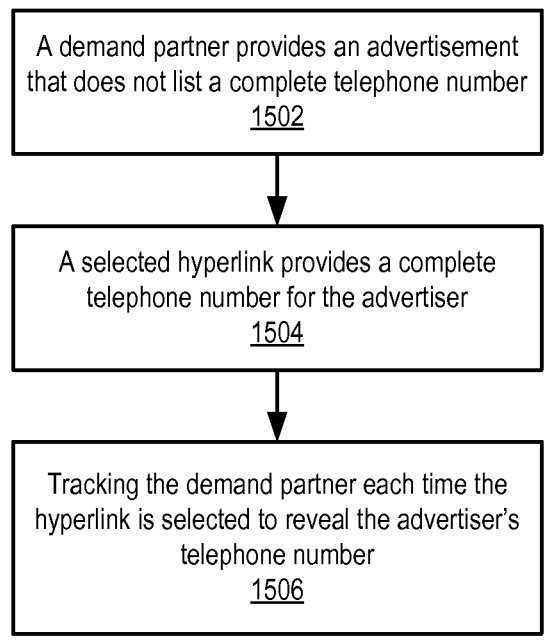

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the advertisement engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
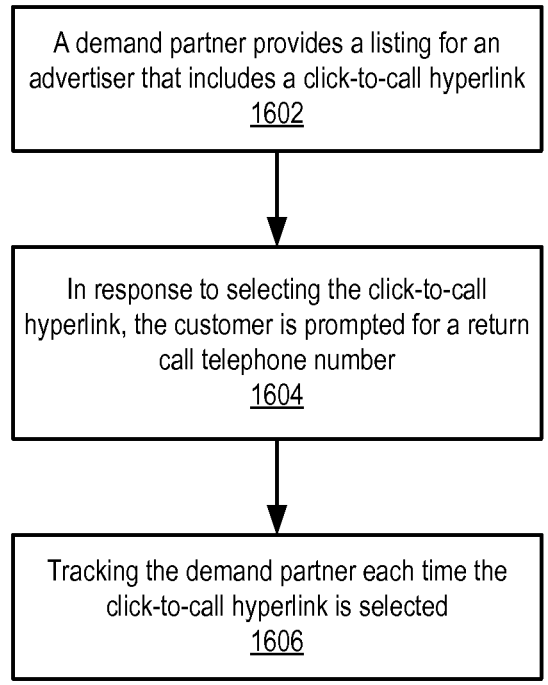

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link (e.g., a hyperlink, or an icon, or a button) is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
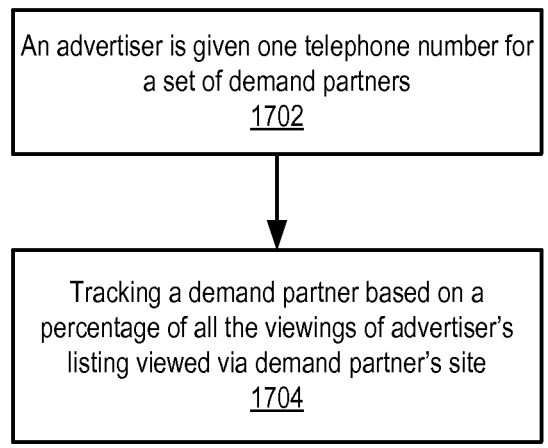

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
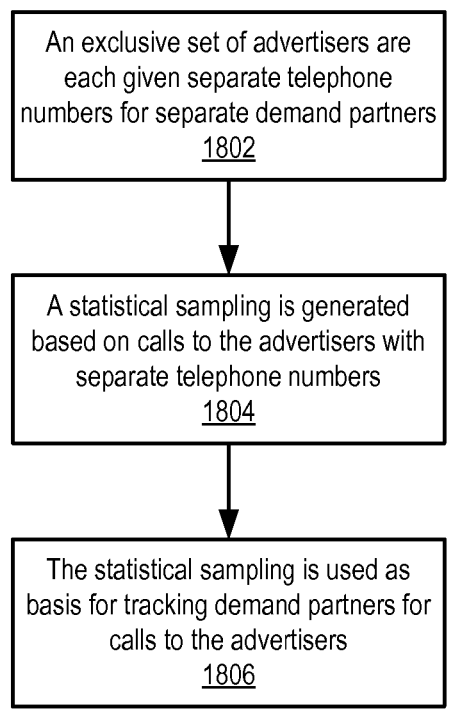

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are each give a unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory/publisher.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that described in U.S. patent application Ser. No. 10/872,117, filed Jun. 17, 2004, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

In one embodiment, not only is it designed to track the number of calls and precise time of calls, but the demand source at which the caller viewed the advertisement may also be tracked. Online directories can have many different external web sites through which they syndicate the same advertisers, and it can be useful to know from which web site the phone call originated so that, in some cases, the directory can compensate the external web site for having brought customers. Provisional U.S. Patent Application Ser. No. 60/560,926, filed on Apr. 9, 2004, outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time/duration of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

In one embodiment, the unique telephone numbers assigned to an advertiser and or a demand partner is for a short period of time after the listing of the advertiser containing the unique telephone numbers is presented. After the time period, the telephone numbers can be re-assigned to other advertisers.

Figure 19:
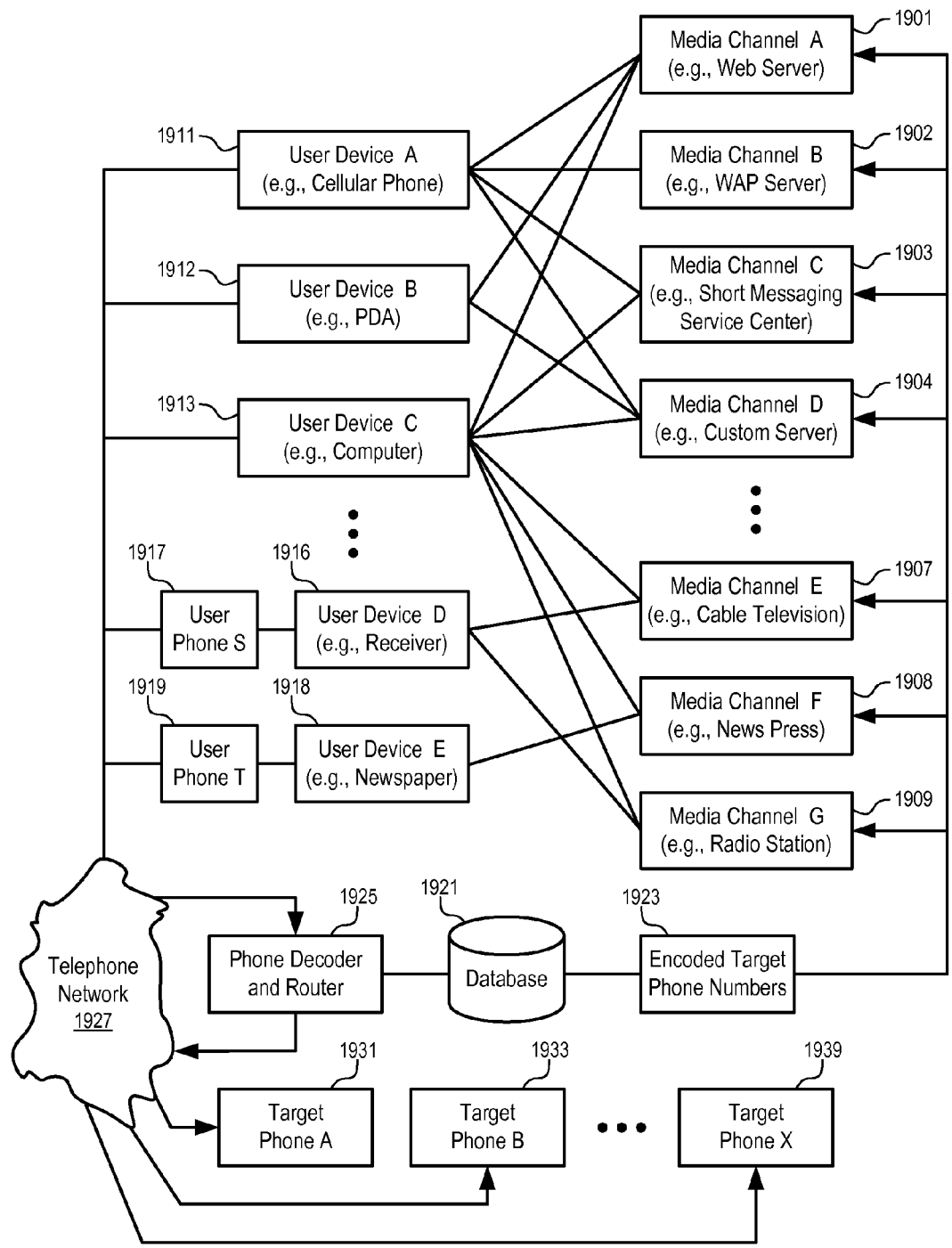
FIG. 19 shows a diagram of a system to make and track phone connections according to one embodiment of the present invention.

FIG. 19 shows a diagram of a system to make and track phone connections according to one embodiment of the present invention.

In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment of the present invention, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, a user device can include a USB phone, a Bluetooth wireless phone, or one or more speakers or headphones with one or microphones for the implementation of a software based phone.

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment of the present invention, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, packet switched, or partially circuit switched and partially packet switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment of the present invention, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment of the present invention, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment of the present invention, the phone decoder and router (1925) determines the target phone number from the encoded target phone number dialed by the user and then dials the target phone number for the user and joins/bridges the phone calls so that the user can talk to the target phone.

In one embodiment of the present invention, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join/bridge the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement is presented to end users around the globe without geographical area limitations. For example, an advertiser may provide services and/or products to customers around the globe. The advertisement may be delivered to the worldwide users of the Internet.

In one embodiment of the present invention, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment of the present invention, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

One embodiment of the present invention includes an Application Programming Interface (API) for managing Pay Per Call advertisements.

Application Programming Interfaces (APIs) are designed interfaces through which computers, or computer programs, talk to one another. In general, humans talk to server computers through a user interface like a web browser, while client computers talk to server computers through APIs to get and modify raw data. For instance, to implement Pay Per Call yellow-page listings on a VoIP client, the VoIP client application can use the APIs to interact with a server of the advertisement provider/distributor.

For example, the VoIP client application may use the APIs to request listings for display; and the server(s) of the advertisement provider/distributor (e.g., Ingenio) would send the data through the API to the VoIP client application. The VoIP client application can then assemble the data and display it with the particular look and feel according to the design of the VoIP client application.

For example, a partner site can use the API to create new pay per call listings. For instance, APIs can be used to call up pay per call advertisements every time a user does a search.

In one embodiment of the present invention, an advertisement provider/server distributes advertisements for presentation on various media channels, such as in search result pages (e.g., as sponsored links, as service listings, such as yellow page advertisements, service directories, advertisements in printed media, radio or television, advertisements on mobile communication devices through email or short text messages or audio or video or multi-media messages, etc.)

In one embodiment, the advertisements are presented on behalf of the advertisers; and the advertisers pay for the advertisements when the advertisements generate real time communication leads (e.g., telephone calls) to the advertisers. For example, the advertisers may be charged on a per call basis for the telephonic calls generated as a result of the advertisements. Thus, the charge of the advertisements are performance based, measured based on the telephonic calls generated as a result of the advertisements. Alternatively or in combination, the charge may also be partially based on duration of the phone connection (e.g., on a per minute basis); and the fees based on the duration may be charged to the caller and/or the advertiser.

In one embodiment, the telephone calls made as a result of the advertisements are monitored. For example, the telephone numbers in the advertisements can be assigned to the advertisers for the advertisements. When the assigned telephone numbers are called, the calls are connected to a connection server before being connected to the advertisers. From the phone number dialed before connecting to the connection server and/or the extension number dialed after connecting to the connection server, the connection server can determine the corresponding advertisers and/or advertisements. The connection server can then connect the calls to the respective advertisers. Thus, the connection server can monitor the calls generated from the advertisements.

In one embodiment, a request for a telephone call is transmitted to the connection server together with the telephone number of the consumer and an indication of the advertiser/advertisement. The connection server can then make calls to both the consumer and the advertiser separately and then connect the calls to join the consumer and the advertiser for telephonic conversation. Thus, the connection server can monitor the calls generated from the advertisements.

In one embodiment, the telephonic connection between the consumer and the advertiser is based on VoIP (Voice over Internet Protocol). The connection between the VoIP applications may be established with or without the help of a centralized server. For example, the VoIP applications may relay the online presence information/availability status on the network without a centralized server. In one embodiment, the VoIP applications are designed to report the information about the call (e.g., when the call is made, the duration of the call, etc.) to a server (e.g., a centralized server of the VoIP system or a server of the advertisement provider/distributor).

In one embodiment, the advertisers may set their bids for the advertisements on a per call basis. The advertisements are distributed based at least partially on the per call price bids specified by the advertisers.

In one embodiment, an advertiser may use a graphical user interface of a client application to interact with a server of the advertisement provider to manage the advertisement. In one embodiment, the client application uses the Application Programming Interface according to embodiments of the present invention. In one embodiment, a supply partner may manage advertisements through the Application Programming Interface on behalf of a plurality of advertisers, with or without a graphical user interface.

In one embodiment of the present invention, the advertisement provider provides an Application Programming Interface (API) for the management of Pay Per Call advertisements. A third party may use the API to develop user interfaces which may help an advertiser to create, update, delete and get current settings for an advertisement (listing).

Figure 20:
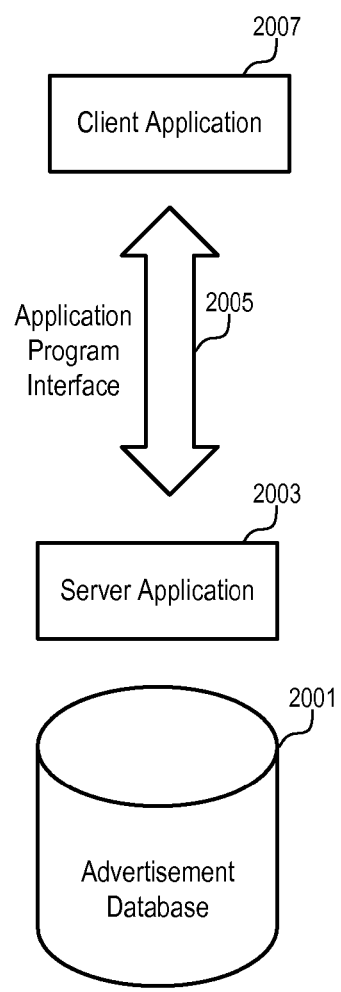
FIG. 20 shows a diagram of managing advertisement data according to an application programming interface over a network according to one embodiment of the present invention.

FIG. 20 shows a diagram of managing advertisement data according to an application programming interface over a network according to one embodiment of the present invention. In FIG. 20, the advertisement database (2001) is maintained via an server application (2003). A set of application programming interfaces is provided to allow access to the server application (2003) over a data communication network (2005). Using the application programming interfaces, a client application (2007) can be independently developed (e.g., by a third party application developer) to communicate with the server application (2003). In one embodiment, the application programming interface allows the client application to invoke a set of methods according to pre-defined data interface for providing input and retrieving output.

In one embodiment, the API for the management of Pay Per Call advertisements includes a number of methods which an application may invoke to manage the advertisements/listings (e.g., through a web service). In one embodiment, a web service using Simple Object Access Protocol (SOAP), Representational State Transfer (REST), remote procedure call (RPC) via HyperText Transfer Protocol (HTTP) or binary access is used to invoke one or more of the methods of the API. Alternatively, a custom designed communication protocol can also be used.

Figure 21:
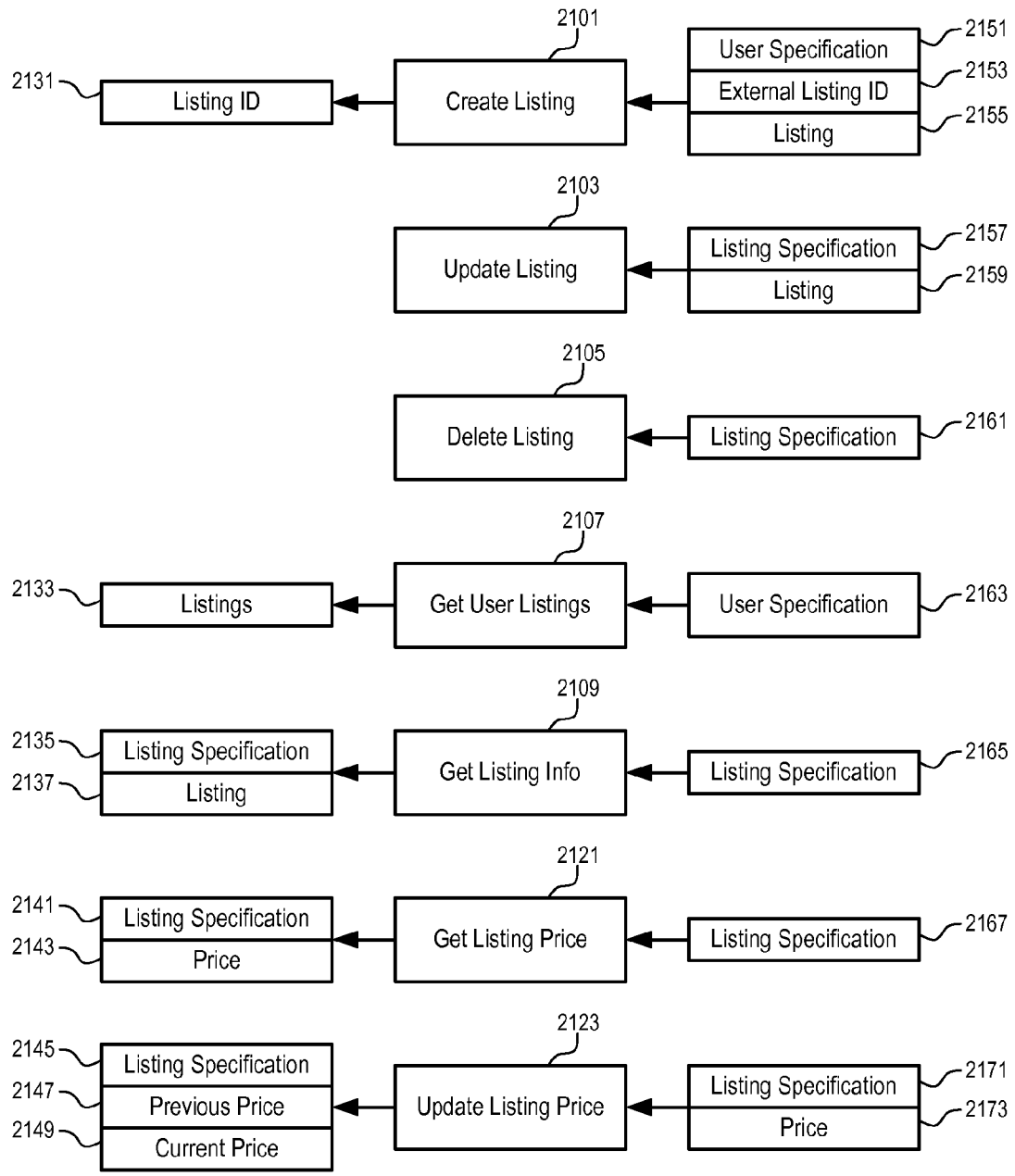
FIGS. 21-22 illustrate application programming interfaces according to one embodiment of the present invention.
Figure 22:
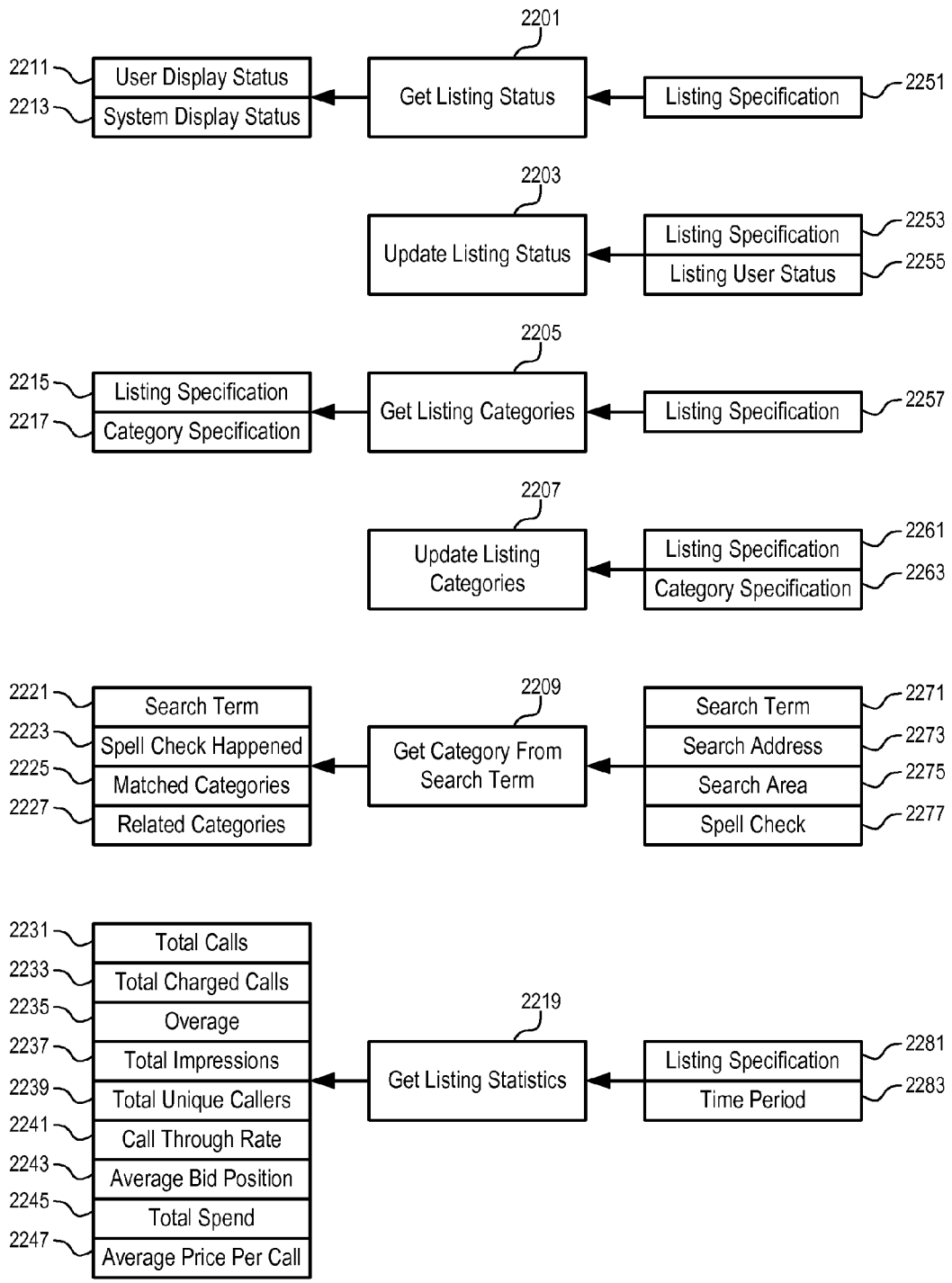
Figure 23:
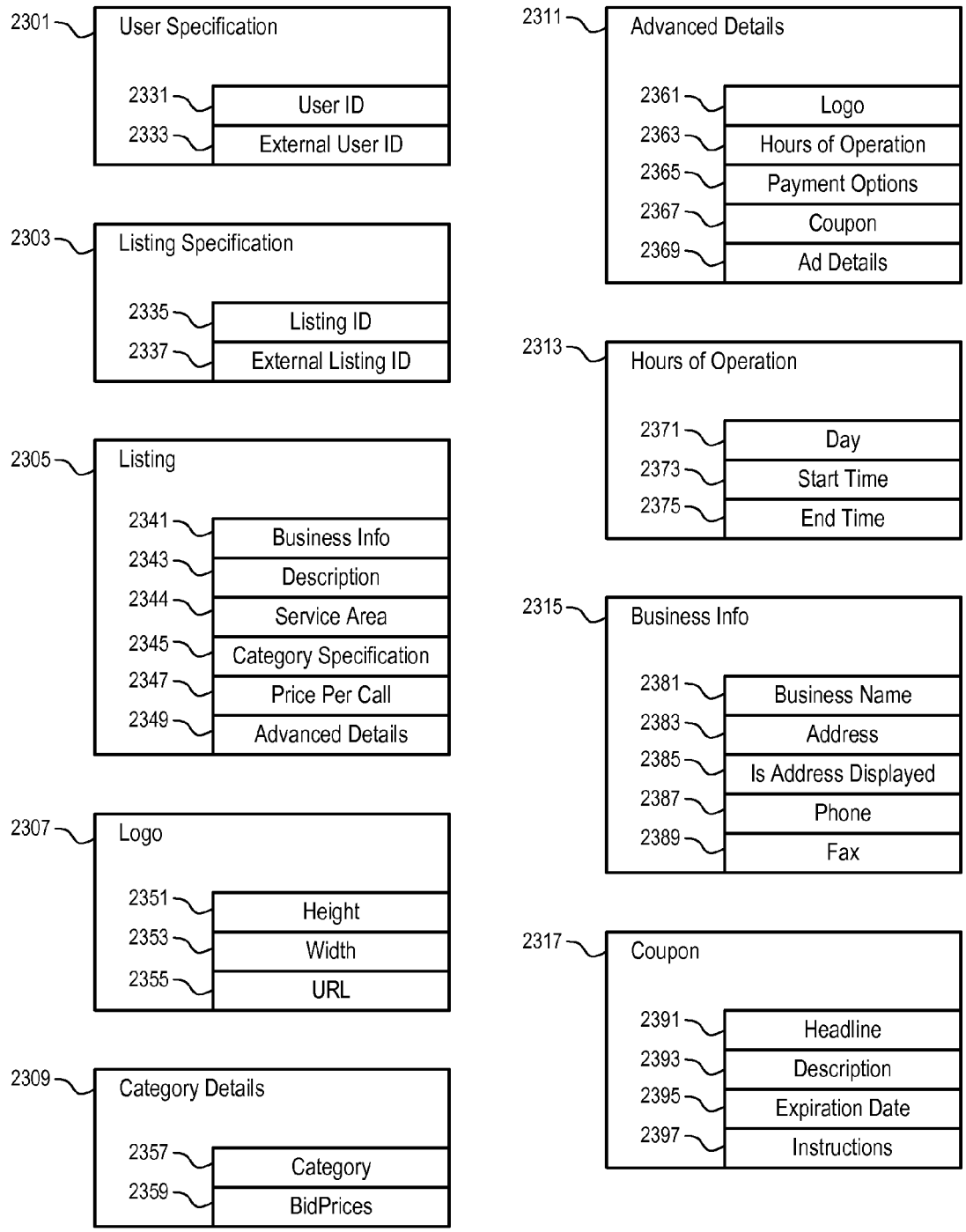
FIG. 23 illustrates data objects for application programming interfaces according to one embodiment of the present invention.

FIGS. 21-22 illustrate application programming interfaces according to one embodiment of the present invention. FIG. 23 illustrates data objects for application programming interfaces according to one embodiment of the present invention.

A method, for example, CreateListing (e.g., Create Listing 2101) can be used to create a new listing when the user provides the detailed information about the listing (e.g., Listing 2155) together with the identification of the advertiser (e.g., User Specification 2151). After the listing is created, the server system provides the calling application with an internal listing identifier (e.g., Listing ID 2131) generated by the system. The internal listing identifier can be subsequently used to identify this listing. Optionally, the user may further include an external identifier (e.g., External Listing ID 2153) to identify the listing when making the request to create the listing.

In one embodiment, the external identifier and/or the internal listing identifier of the listing can be subsequently used to identify the listing. For example, an object (e.g., Listing Specification 2303) for the identification of a listing may include a field for specifying the internal listing identifier (e.g., Listing ID 2335) and a field for specifying the external identifier (e.g., External Listing ID 2337).

In one embodiment, an object used to define the specification of an advertisement (listing) (e.g., 2305) includes a number of fields, such as Business Info (2341) specifying the contact information of the advertiser, Description (2343) specifying a short advertisement message (e.g., less than 80 characters), Service Area (2344) of the product and/or service advertised by the listing, Category Specification (2345) specifying one or more categories of services and/or products of the advertisement, Price Per Call (2347) specifying the bids for the communication leads (e.g., telephone calls) generated by the advertisement, and Advanced Details (2349).

In one embodiment, an object Business Info (2315) includes a number of fields, such as Business Name (2381), address (2383) of the business/advertiser, phone number (2387) of the business/advertiser, and fax (2389) of the business/advertiser. In one embodiment, a phone number or a fax number may include the country code, area code, and/or an extension code. In one embodiment, a field (e.g., Is Address Displayed 2385) allows the user to indicate whether or not the specified address (2383) is to be displayed with the advertisement.

In one embodiment, an advertisement can have Advanced Details (2311), such as Logo (2361), Hours of Operation (2363), Payment Options (2365) (e.g., cash, Visa, MasterCard, American Express, discover, debit, personal check, PayPal, etc), Coupon (2367), and Ad Details (2369) which describes for further details of the advertisement.

For example, a Logo (2307) can be specified by a Universal Resource Locator (URL) (2355) which points to a downloadable image of the logo, and the dimensions of the logo, such as Height (2351) and Width (2353).

For example, an object for Hours of Operation (2313) specifies the day of the week (e.g., Day 2371), the start time (e.g., 2373) and the end time (e.g., 2375) of the specified day. A number of objects for Hours of Operation (2313) can be used to specify a schedule during which the advertiser is to be in operation (e.g., to take calls generated from the advertisement).

In one embodiment, an electronic coupon can be attached to an advertisement. A coupon (2317) may include Headline (2391), Description (2393) specifying the offer of the coupon, Expiration Date (2395) of the coupon, and Instructions (2397) for the redemption of the coupon.

A method, for example, UpdateListing (e.g., Update Listing 2103) can be used to update an existing listing according to the detailed information provided (e.g., provided via object Listing 2159). The listing may be identified using the internal identifier generated by the system when the listing is created, and/or the external identifier provided to the system when the creation of the listing is requested. In one embodiment, an object (e.g., Listing Specification 2157) is used to identify an listing for access; and such an object (e.g., 2303) may include the internal listing identifier (e.g., Listing ID 2335) that is returned by the system during the creating of the listing and the external listing identifier (e.g., External Listing ID 2337) that is specified by the user during the creating of the listing.

A method, for example, DeleteListing (e.g., Delete Listing 2105) can be used to delete an existing listing. The listing can be identified using the internal identifier generated by the system when the listing is created, or the external identifier provided to the system when the creation of the listing is requested (e.g., using Listing Specification 2161). In one embodiment, a number of listings can be deleted in a batch mode when a list of objects specifying that listings is provided.

A method, for example, GetUserListings (e.g., Get User Listings 2107) can be used to get the listings associated with a specified user (e.g., via an object User Specification 2163). In one embodiment, the user may be specified using an internal user ID that is assigned to the user during the creation of the user in the system, and/or be specified using an external user ID that is provided by the user when the creation of the user in the system is requested. In one embodiment, an object (2301) is used to represent a user; and such an object may include the internal user ID (e.g., User ID 2331) and/or the external user ID (e.g., External User ID 2333). The internal user ID is created by the system when an account for the user is create using a graphical user interface (e.g., a web based user interface) or an application programming interface. The external user ID is provided by the user when the account is created for the user. In one embodiment, a list of objects (e.g., 2133) specifying the listings of the user is retrieved when the method GetUserListings (e.g., Get User Listings 2107) is invoked.

A method, for example, GetListingInfo (e.g., Get Listing Info 2109) can be used to retrieve the details of an existing listing. The listing can be specified using the internal and/or external identifiers (e.g., via Listing Specification 2165). In one embodiment, a number of listings can be retrieved in a batch mode. In response to receiving a list of objects identifying the listings, the system returns a list of objects, each containing the identification of one listing (e.g., Listing Specification 2135) and the details of the listing (e.g., Listing 2137).

A method, for example, GetListingPricePerCall (e.g., Get Listing Price 2121) can be used to retrieve the current price per call (bid) stored in the system for the specified listing (e.g., specified using the internal and/or external identifier via Listing Specification 2167). In one embodiment, the prices for a number of listings can be retrieved in a batch mode. In response to receiving a list of objects identifying the listings, the system returns a list of objects, each containing the identification of one listing (e.g., Listing Specification 2141) and its price (e.g., Price 2143).

A method, for example, UpdateListingPricePerCall (e.g., Update Listing Price 2123) can be used to update/submit the price per call bid in the system for the specified listing (e.g., specified using the internal and/or external identifier via Listing Specification 2171). In one embodiment, the price for a number of listings can be updated in a batch mode. In response to receiving a list of objects identifying the listings (e.g., Listing Specification 2171) and the price (e.g., Price 2173), the system returns a list of objects, each containing the identification of one listing (e.g., Listing Specification 2145), its price before the update (e.g., Previous Price 2147) and its updated price (e.g., Current Price 2149).

A method, for example, GetListingStatus (e.g., Get Listing Status 2201) can be used to retrieve the status information about a specified listing. In one embodiment, the user may specify the status of a listing as active or paused. When active, the listing is available for selection for presentation to the consumers (e.g., users of a search engine, etc.). When paused, the listing will not be presented even if there is a matching opportunity for presenting the listing. In one embodiment, the system may specify the status of a listing as Active or Paused. In one embodiment, the system may further specify the reason for the Paused status, such as Invoice Approval Pending, Invoice Not Approved, Not Accepted, Budget Limit Reached, Monthly Limit Reached, Credit Card Failed, Credit Card Expired, Credit Limit Reached, Low Funds, No Payment Info, Pending Acceptance, No Payment Plan, etc. The method can be used to retrieve such status information about a listing. In one embodiment, the status information for a number of listings can be retrieved in a batch mode. In response to receiving a list of objects identifying the listings (e.g., Listing Specification 2251), the system returns a list of objects, each containing the user specified status (e.g., User Display Status 2211) and the system specified status (e.g., System Display Status 2213) for one listing.

A method, for example, UpdateListingStatus (e.g., Update Listing Status 2203) can be used to update/submit the user defined status of a specified listing. For example, the method can be used to receive user input that indicates whether the status of the listing should be active or paused. In one embodiment, the status of a number of listings can be specified in a batch mode. In response to receiving a list of objects identifying the listings (e.g., Listing Specification 2253) and the user specified status (e.g., Listing User Status 2255), the system updates the status of the listings accordingly.

A method, for example, GetListingCategories (e.g., Get Listing Categories 2205) can be used to retrieve from the system the current categories under which a specified listing is listed. In general, a listing can be listed in one or more different categories. When a search matches any of the specified categories, the listing may be selected for presentation. In one embodiment, the category information for a number of listings can be retrieved in a batch mode. In response to receiving a list of objects identifying the listings (e.g., Listing Specification 2257), the system returns a list of objects, each containing the identification of one listing (e.g., Listing Specification 2215) and its category information (e.g., Category Specification 2217) that contains one or more categories under which the listing is listed.

A method, for example, UpdateListingCategories (e.g., Update Listing Categories 2207) can be used to update/submit to the system the categories under which a specified listing is listed. In one embodiment, the listing can be specified using an object (e.g., Listing Specification 2261) and category information of the listing can be specified using another object (e.g., Category Specification 2263) which contains one or more categories under which the listing is listed.

A method, for example, GetCategoryFromSearchTerm (e.g., Get Category From Search Term 2209) can be used to retrieve the categories of listings that match and/or are related to the specified key words of a search. For example, the API may accept a string of characters as one or more key words (e.g., Search Term 2271).

A method, for example, can be used to search categories of listings. The search may be related to a specific address (e.g., a street address specified via object Search Address 2273). The search may be limited to the categories of listings that have a service area within a specified geographic area, such as within the city region of the specified address, within the state or nation of the specified address, or a number of units (e.g., miles, street blocks, etc) within the radius of the specified address, etc. In one embodiment, the search may specify that the requirement for the search area is unknown, in which case the server will attempt to determine a geographic area for the search. In one embodiment, the search area is specified via an object (Search Area 2275).

In one embodiment, in the request for key word based search of categories, the API further receives an indication (e.g., Spell Check 2277) of whether or not spell checking is to be performed on the string of search term. In one embodiment, when such a method is executed to retrieve categories based on the search terms, the system can update the search term to indicate the corrected spelling. In one embodiment, the spelling-corrected search term is provided in an object (e.g., Search Term 2221). In one embodiment, an indication (e.g., Spell Check Happened 2223) of whether a correction has been made to the search term is also provided.

In one embodiment, the categories that match the search terms are returned to the calling application after the search (e.g., via an object for Matched Categories 2225). The search result may further include a number of top price bids for the listings in the corresponding categories (e.g., the top 5 prices). In one embodiment, an object for describing a matched category (e.g., Category Details 2309) includes the category (e.g., 2357) and a number of top price bids (e.g., BidPrices 2359) in the category. In one embodiment, the related categories that may fit the search terms are also suggested (e.g., via an object for Related Categories 2227).

A method, for example, GetListingStatistics (e.g., Get Listing Statistics 2219) can be used to retrieve the statistics related to a given listing (e.g., specified using an object Listing Specification 2281) during a specified time period (e.g., Time Period 2283). Examples of time periods include today, yesterday, week to date, month to date, quarter to date, year to date, etc. In one embodiment, the statistics includes total number of calls (e.g., Total Calls 2231), total number of charged calls (e.g., Total Charged Calls 2233), overage (e.g., 2235, the number of minutes over a predetermined "free connection time" allowed per call, beyond which the communication time may be charged at a predetermined per minute rate), total impressions (e.g., 2237, the number of times an advertisement is viewed, which can be estimated based on the number of times the advertisement is being requested or can be tracked based on the number of times the advertisement is loaded into browsers for presentation), total number of unique callers (e.g., Total Unique Callers 2239), call through rate (e.g., 2241), average bid position (e.g., 2243), total amount spent on the listing for advertisement (e.g., Total Spend 2245), average price per call (e.g., 2247), etc.

In general, more or less methods may be implemented for a listing management API.

In one embodiment, the API is provided through a web service (e.g., using a web server). Alternatively, other types of services (servers), such as a server with a custom designed communication protocol can also be used.

Figure 24:
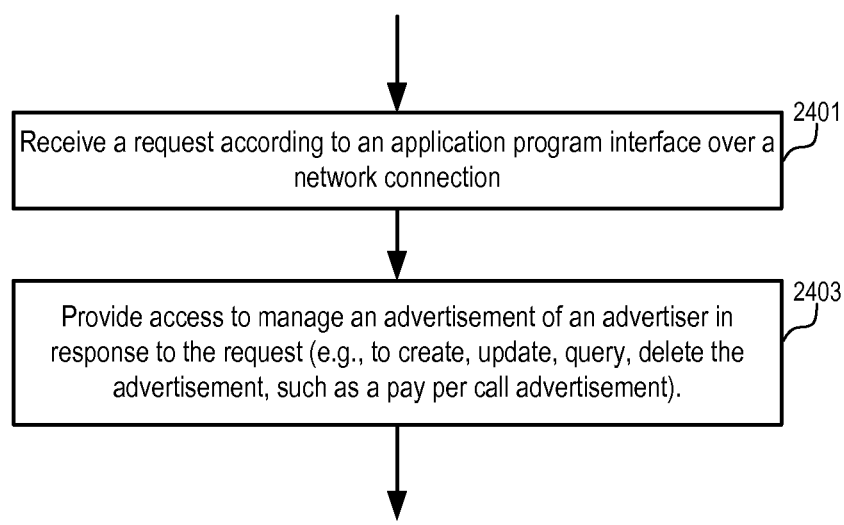
FIG. 24 shows a method to manage pay per call advertisements according to one embodiment of the present invention.

FIG. 24 shows a method to manage pay per call advertisements according to one embodiment of the present invention. In FIG. 24, a request is received (2401) according to an application programming interface over a network connection. Access to manage an advertisement of an advertiser is provided (2403) via the application programming interface in response to the request (e.g., to create, update, query, delete the advertisement, such as a pay per call advertisement).

In one embodiment, the advertisement is to be embedded with a real time communication reference assigned to the advertiser; the real-time communication reference is to be used to request a real time communication connection with the advertiser; and the advertiser is to be charged for communication leads generated via the real-time communication reference embedded in the advertisement.

In one embodiment, a specification of the advertisement is stored according to the request; an identification of the advertisement is generated; and the identification of the advertisement is provided via the application programming interface.

In one embodiment, the advertisement is identified according to an identification of the advertisement provided in the request; and the advertisement is updated according to a specification provided in the request, or the advertisement is deleted according to the request, or a specification of the advertisement is provided via the application programming interface, or a price per communication lead generated from the advertisement is provided via the application programming interface, or a price per communication lead generated from the advertisement is updated according to the request, or status information of the advertisement is provided via the application programming interface, or a status indicator of the advertisement is updated according to the request to specify whether the advertisement is to be presented, or information specifying one or more categories of the advertisement is provided via the application programming interface, or information specifying one or more categories of the advertisement is updated according to the request, or statistical data related to the advertisement for a time period specified in the request is provided via the application programming interface.

In one embodiment, the statistical data includes one or more of: number of communication connections made in response to the advertisement, number of communication leads generated in response to the advertisement, estimated number of presentations of the advertisement, number of unique callers who have requested communication connections in response to the advertisement, call through rate, average bid position of the advertisement, amount spent on the advertisement by the advertiser, and average price per communication lead of the advertisement.

In one embodiment, a list of advertisements of the advertiser is provided according to information specifying the advertiser via an application programming interface.

In one embodiment, one or more categories matching a set of search criteria specified in the request according to an application programming interface is provided. The set of search criteria may include one or more of a search term, a search address, and a geographic area. In one embodiment, spelling checking is performed on the search term; and a spelling-corrected search term is provided via an application programming interface. In one embodiment, one or more categories related to the set of search criteria is further provided.

Figure 25:
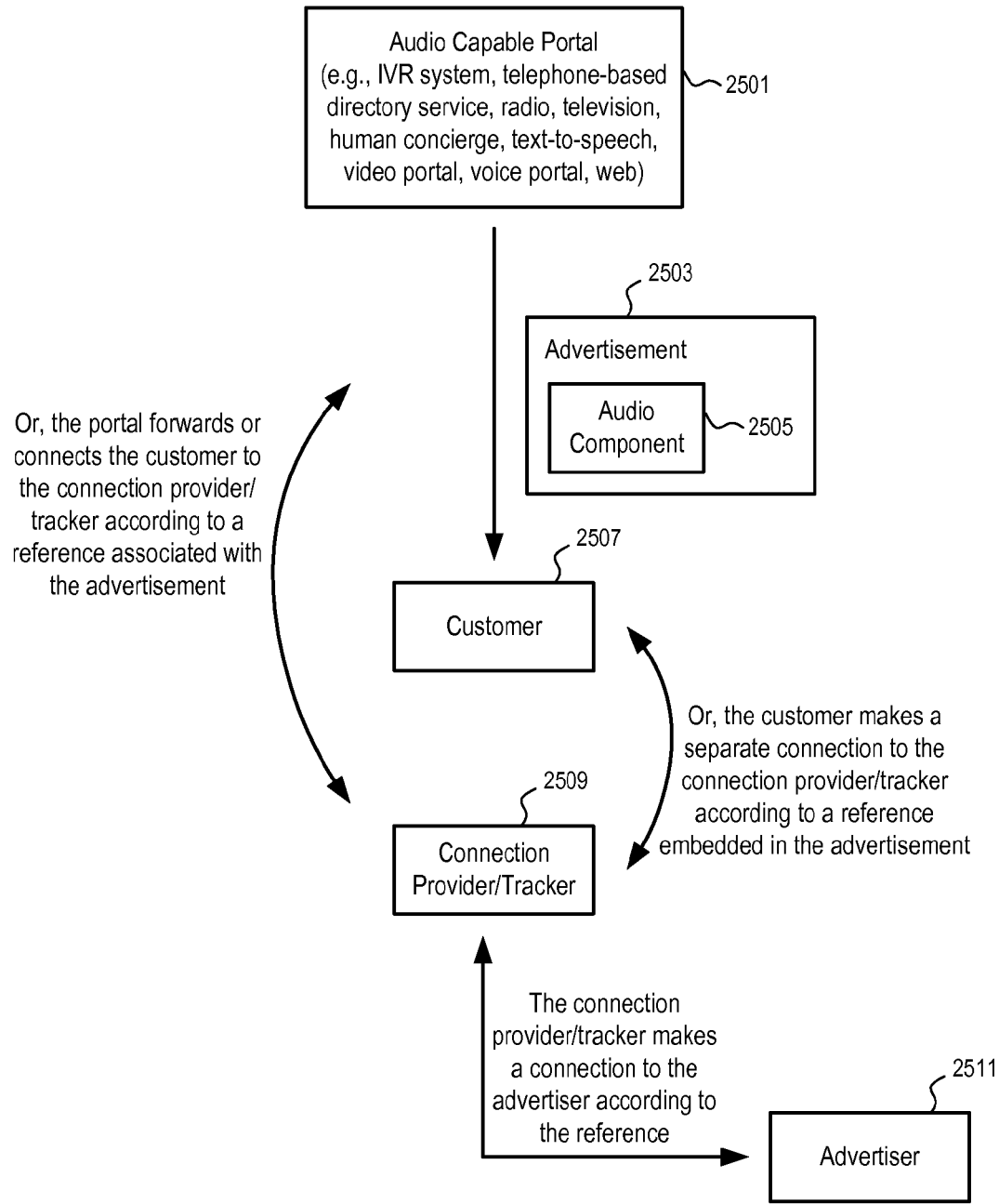
FIG. 25 illustrates ways to provide advertisements via an audio capable portal according to embodiments of the present invention.

FIG. 25 illustrates ways to provide advertisements via an audio capable portal according to embodiments of the present invention. In FIG. 25, an audio capable portal (2501) is used to provide an advertisement (2503) to a customer (2507). The audio capable portal (2501) can be an interactive voice response (IVR) system, a telephone based directory service such as a 411 telephone directory, a radio broadcasting system, a television system, a human concierge, a text-to-speech synthesizer, a video portal, a voice portal, a web site, etc. In one embodiment, the audio capable portal (2501) includes an interactive voice response (IVR) tree that can be used to decide which advertisers to present. For example, after the customer makes a VoIP-based call to a portal, the IVR system may prompt the customer to press 1 for hotels, 2 for restaurants, etc. After the customer specifies the category of products or services, the system can perform a search of advertisements that are relevant to the interest of the customer. In one embodiment, the IVR system can further collect information such as price range, sub-categories, keywords, and/or the geographic area of interest (e.g., via the customer specifying a zip code or selecting a city or metropolitan region). In one embodiment, a human concierge can further assist the customer in providing the answers to the IVR tree.

In one embodiment, the advertisement (2503) includes at least an audio component (2505). In another embodiment, the advertisement (2503) is primarily a voice or audio message. The advertisement (2503) may also include a visual component, such as a text message, a video image, an animation, a still image, etc.

In one embodiment, the advertisement (2503) includes a reference that can be used to ask the connection provider/tracker (2509) to provide a connection between the customer (2507) and the advertiser (2511) of the advertisement (2503).

For example, the reference can be a telephone number of the connection provider/tracker (2509). The telephone number may or may not have an extension. The telephone number may be presented in the audio component and/or the video component of the advertisement. The telephone number is associated with the advertiser (2511) such that when the customer calls the connection provider/tracker (2509) at the telephone number given in the advertisement (2503), the connection provider/tracker (2509) can determine the phone number of the advertiser (2511) based on the telephone number that the customer used to call the connection provider/tracker (2509). The connection provider/tracker (2509) can then connect the call to the advertiser (2511), providing a communication lead to the advertiser (2511). In one embodiment, the advertiser (2511) pays for the advertisement based on the communication leads received from the connection provider/tracker. For example, the advertisement can be charged for in a pay per call format, where the call represents a communication lead, such as a telephone call, or other types of calls for the establishment of real time communication connections.

Alternatively or in combination, the reference can include a SIP address for the initiation of VoIP calls to the connection provider/tracker (2509), or user names in an instant messaging system, or a reference to request a callback to the customer in relation with the advertisement, or a reference to request a dynamically assigned phone number for the advertisement. In one embodiment, multiple types of references can be provided; and the customer can choose one to request for a connection to the advertiser.

In one embodiment, the customer makes a separate connection to the provider/tracker (2509), in response to the advertisement, to request a connection with the advertiser (2511).

Alternatively, the customer (2507) may request the audio capable portal (2501) to arrange the connection. For example, in response to the advertisement, the customer may communicate a request to the audio capable portal (2501) via a voice command (e.g., "connect me to this advertiser") or an audio signal. For example, the customer (2507) can press the "#" key on the dial pad of a phone that is connected to the audio capable portal (2501) to generate the corresponding DTMF signal to indicate the request for a connect to the advertiser (2511). The customer (2507) may also implicitly request the connection by not providing a specific input within a period of time. For example, within a pre-determined period of time (e.g., 5 second), if the customer (2507) does not press the "*" key on the dial pad of the phone, it can be determined that the customer wants the connection to the advertiser (2511).

Alternatively, the customer (2507) may send the request via a button or link on a graphical user interface of a software phone (or a data enabled phone) that is used to connect to the audio capable portal.

In one embodiment, in response to the request from the customer, the audio capable portal (2501) connects the customer to the connection provider/tracker (2509) according to the reference associated with the advertisement. For example, the audio capable portal (2501) can forward the call from the customer (2507) to the connection provider/tracker (2509). Alternatively, the audio capable portal (2501) can make a separate call to the connection provider/tracker (2509) according to the reference and then bridge, conference, or join the calls to connect the customer (2507) to the connection provider/tracker (2509).

In one embodiment, the advertisements are presented as a "switch pitch." For example, the customer may ask for "Hilton Hotel" (e.g., in a directory assistance request). The system determines whether it has other advertisements in this same category (e.g., hotel), and if so, presents one or more of the advertisements selected from this category. For instance, the presentation may include an offer, such as: "Sheraton Hotels is offering a 20% discount this week. Would you like to be connected to them instead?"

In one embodiment, such advertisements are triggered by certain keywords detected in the conversation, such as "hotel." Alternatively or in combination, the advertisements can be selected according to category. For example, the customer may have pressed #3 to request directory assistance in the category of travel accommodations. In one embodiment, the voice request made by the customer and/or the response of a human concierge is converted into text via speech recognition; and based on the text, the system automatically determines the context of the conversation and selects one or more advertisements for presentation according to the determined context. In one embodiment, a number of advertisements are selected and presented to the human concierge (e.g., in a visual form on a display device in front of the human concierge); and the human concierge can then select one for presentation via the audio capable channel to the customer.

In one embodiment the advertisements are cross-sells. The system determines whether it has advertisements in a category related to the category of interest to the customer, and if so, presents one or more of the advertisements selected from the related category. For instance, if the customer asks for airlines, advertisements for rental cars can be selected for presentation. In one embodiment, the system determines the context of the conversation (e.g., based on text generated via speech recognition) and selects one or more related context for the selection of advertisements.

In one embodiment, the system automatically sets limits to the cross-selling or switch-pitch that may occur. For instance, if the customer asks for directory assistance in the category of "hotels," the system is configured not to play advertisements for a set of hotels that are not in the economic level indicated by the customer. The system can determine an economic level according to the explicit input from the user, or derived based on an example provided by the customer.

In one embodiment, the system can automatically exclude certain advertising partners. For example, if one audio capable portal has a relationship with Hilton Hotels, they may want to exclude advertisements for "Sheraton Hotels" from being played in their context when querying for advertisements from a database (e.g., a database maintained by a partner but not by the audio-capable portal). One or more filters can be applied when selecting from the advertisements that are received from the database as a query result.

In one embodiment, the system uses one or more pre-determined rules to select the advertisements based on one or more parameters derived specific from the context. The parameters may be explicitly specified by the customer (e.g., via an IVR tree), or implicitly derived from the communications received from the customer. For example, when the customer asks for a specific hotel, the system can implicitly derive the economic level based on the mentioned hotel (e.g., using a look up table that pre-categorize the economic level of known hotels); and the economic level determined based on the hotel can be applied to the selection of rental car advertisements in cross selling, or the selection of hotel advertisements in pitch switching.

In one embodiment, the advertisements are selected according to at least the pay per call price bids. For example, the system can sort the candidate list and select the advertisement that has the highest pay per call price bid. In one embodiment, the system can also consider the yield of advertisements in the past in making the selection. For example, a conversion rate, such as the ratio between a count of presentations made in a past period of time and a count of communication leads resulting from the presentations, can be used to evaluate the yield of the advertisements. Thus, if many consumers decide to connect to the advertiser in response to the advertisement, it would positively affect that advertisement's place in the rank order.

In one embodiment, the key factors used to rank the advertisements include the pay per call price bid and yield; and an overall assessment of "value" (e.g., the product of the conversion rate and the price bid, which indicates the expected return from presenting the advertisement) can be determined for the selection of an advertisement for presentation. Using such an approach of overall value assessment, the best advertisements (e.g., those that earn the audio-capable portal the most money) can be selected for presentation to the customers.

In one embodiment, the ranking system can also take into account yield on different audio-capable portals, or website, differently. For instance, a rental-car advertisement may have a very high yield on a travel-oriented audio-capable portal but a low yield on a dining-oriented portal. The system can automatically keep track of the yield rates of an advertisement in different contexts (e.g., different demand partners, different searching keywords, different search strategies, such as cross-selling or pitch-switching, etc.) and use the tracked information in determining which advertisement to present in individual context. For example, in one embodiment, the system tracks not only the demand partners who are responsible for delivering the advertisement but also the context of the presentation of the advertisement, such as the keywords used in a search which results in the selection of the advertisement for presentation, one or more keywords that describe the environment in which the advertisement is presented in (e.g., travel or dining oriented context), and/or the target of the directory assistance request. From the tracked information, the system can determine a conversion rate that is specific to a demand partner, a set of searching keywords, and/or a specific search strategy.

In FIG. 25, based on the reference that is used to establish the connection between the connection provider/tracker (2509) and the customer (2507), the connection provider/tracker (2509) counts the communication leads provided to the advertiser (2511); and the advertiser (2511) is charged for the advertisement based on the communication leads delivered.

In one embodiment, the audio capable portal (2501) receives the advertisement, together with the reference, from an advertisement provider via an application programming interface (API). For example, an audio advertisement can be transmitted to the audio capable portal (2501) in one of a number of formats, such as wav, mp3, Ogg Vorbis, AC-3, MPEG-4, RealAudio, etc. The advertisement provider may be the same entity as the connection provider/tracker (2509). Alternatively, the advertisement provider and the connection provider/tracker (2509) can be separate, cooperative entities.

In one example, when the audio capable portal (2501) has an opportunity to present an advertisement to the customer (2507), the audio capable portal (2501) can query the connection provider/tracker (2509) via an API to obtain an advertisement according to one or more criteria. The API may be provided via a web service (e.g., via an HTTP protocol). For example, when the customer asks for a phone number of a plumber, an advertisement of a different plumber, or an advertisement related to plumbing, can be requested from the connection provider/tracker (2509) (e.g., via a HTTP request). The advertisement and the reference can be provided to the audio capable portal (2501) (e.g., via a HTTP response).

The reference can be presented to the customer (2507) by the audio capable portal (2501) as part of the advertisement (2503). Using the reference, the customer (2507) can directly ask the connection provider/tracker (2509) to provide a connection to the advertiser (2511). For example, a telephone number assigned to the advertiser (2511) can be read to the customer (2507) as part of the audio component (2505) of the advertisement (2503). Further, the audio capable portal (2501) can further offer to SMS or email the telephone number to the customer (2507).

In one embodiment, the audio capable portal (2501) may not present the reference to the customer (2507). The customer (2507) requests for the connection to the advertiser (2511) through the audio capable portal (2501). For example, within a time period of the advertisement, the customer (2507) can say "connect me" or press "#" key; and in response the audio capable portal (2501) arranges the connection to the advertiser (2511) using the reference.

In another embodiment, the audio capable portal (2501) presents the reference to the customer (2507) to allow the customer (2507) to make the request to the connection provider/tracker (2509) directly, or indirectly via the audio capable portal (2501), for a connection to the advertiser (2511).

In one embodiment, the advertisement may be presented according to a general category query. A customer may ask for a "florist in San Francisco" without supplying a particular name of a florist. In this case the system connects the end user with the highest-bidding florist in the desired geography.

In one embodiment, the audio capable portal (2501) receives the advertisement (2503) and then provides the advertisement to the customer (2507). For example, the audio capable portal (2501) can buffer the entire audio advertisement and then play the audio advertisement to the customer after the entire audio advertisement is received. In another example, the audio capable portal (2501) buffers a portion of the audio advertisement and then start to play the audio advertisement to the customer while receiving the remaining portion of the audio advertisement from the advertisement provider. Thus, there is a delay between receiving the audio advertisement from an advertisement provider and presenting the audio advertisement to the customer.

Figure 26:
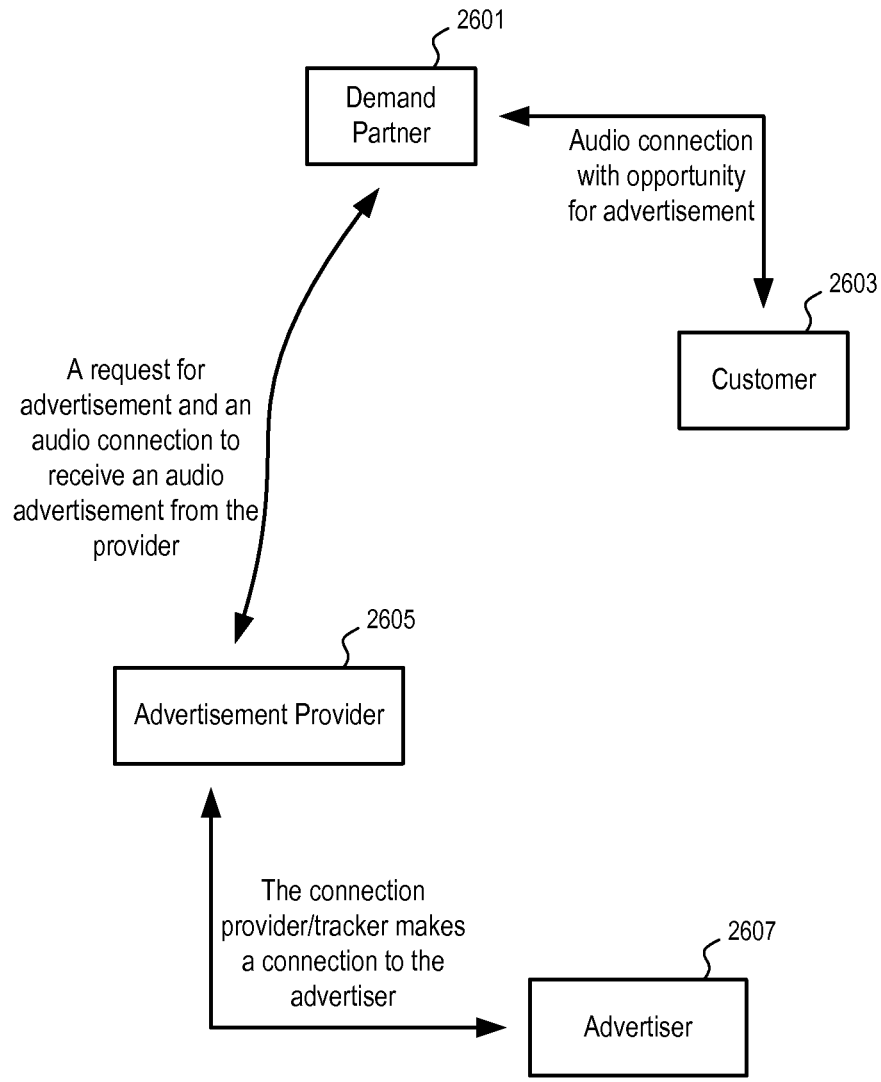
FIG. 26 illustrates a way to provide an advertisement and to connect a customer and an advertiser according to embodiments of the present invention.

In one embodiment, the audio capable portal may use a connection between the customer and the connection provider/tracker to facilitate the transmission of the audio advertisement to the customer, as illustrated in FIG. 26.

In general, when the type of the connection between the customer and the demand partner (2601) is compatible with the connection that may be requested by the customer to advertiser (2607), the process as illustrated in FIG. 26 can be used.

FIG. 26 illustrates a way to provide an advertisement and to connect a customer and an advertiser according to embodiments of the present invention. In FIG. 26, a demand partner (2601) establishes an audio connection with the customer (2603) and determines an opportunity for advertisement. When there is an opportunity to present an advertisement through the audio connection, which may also through text, data, video, etc., the demand partner (2601) connects the audio connection to the advertisement provider (2605).

For example, the demand partner (2601) can make a separate connection to the advertisement provider (2605) to request the advertisement and then bridge or conference the two connections to connection the advertisement provider (2605) and the customer (2603) for the presentation of the advertisement. The demand partner (2601) does not need to buffer the advertisement; and the advertisement can be transmitted from the advertisement provider to the customer in real time without delay.

In another example, the demand partner (2601) can forward (e.g., temporarily) the connection with the customer (2603) to the advertisement provider for the presentation of the advertisement. The demand partner (2601) can hand shake with the advertisement provider (2605) to forward the connection with a request for the advertisement that is formulated by the demand partner (e.g., at least one criterion for the search of the advertisement is specified by the demand partner). In one embodiment, advertisement provider (2605) can subsequently forward the connection back to the demand partner (2601) (e.g., according to the request from the customer).

For example, after the advertisement is presented to the customer and the customer does not wish to be further connected to the advertiser (2607), the advertisement provider (2605) can forward the connection back to the demand partner (2601) for further communications between the demand partner (2601) and the customer (2603). If the customer indicates the desire to talk to the advertiser (2607), in response to the advertisement, the advertisement provider (2605) can further connect the connection to the advertiser (2607) (e.g., through bridging, conferencing, forwarding, etc.) In one embodiment, after the conversation between the customer (2603) and the advertiser (2607), the advertisement provider (2605) can disconnect the advertiser (2607) and forward the connection with the customer (2603) back to the demand partner (2601).

In one embodiment, the demand partner (2601) and the advertisement provider (2605) are the same entity. For example, the advertisement provider (2605) may operate its own audio portal to seek advertisement opportunities over audio connections. Alternatively, the demand partner (2601) and the advertisement provider (2605) can be separate, cooperative entities.

In one embodiment according to FIG. 26, the advertisement provider (2605) does not have to assign a communication reference to the advertiser, or to the advertisement, for the customer to call (e.g., request a connection with) the advertiser.

For example, the advertisement provider (2605) can track the contribution of the demand partner (2601) when the demand partner (2601) forwards, conferences or bridges the audio connection established with the customer to the advertisement provider (2605). For example, the demand partner (2601) can initiate a VoIP-based connection with the advertisement provider (2605); and the identity of the demand partner can be identified based on the source address of the connection. For example, the demand partner (2601) can call a telephone number of the advertisement provider (2605) to make a phone connection; and, the demand partner can be identified via an Automatic Number Identification (ANI) service. The advertisement provider (2605) can keep track of the audio channels that are used to delivered the advertisements; and when a request for a connection with the advertiser (2607) is detected in an audio channel, the contact information of the advertiser of the advertisement delivered in that audio channel can be looked up to make the connection to the advertiser (2607).

Alternatively or in combination, a communication reference can also be assigned to the advertiser and/or the advertisement. The communication reference can be embedded in the advertisement such that after the communication connection between the advertisement provider and the customer (2603) is disconnected, the customer (2603) can still use the communication reference, which is presented with the advertisement, to request a connection with the advertiser (2607).

Figure 27:
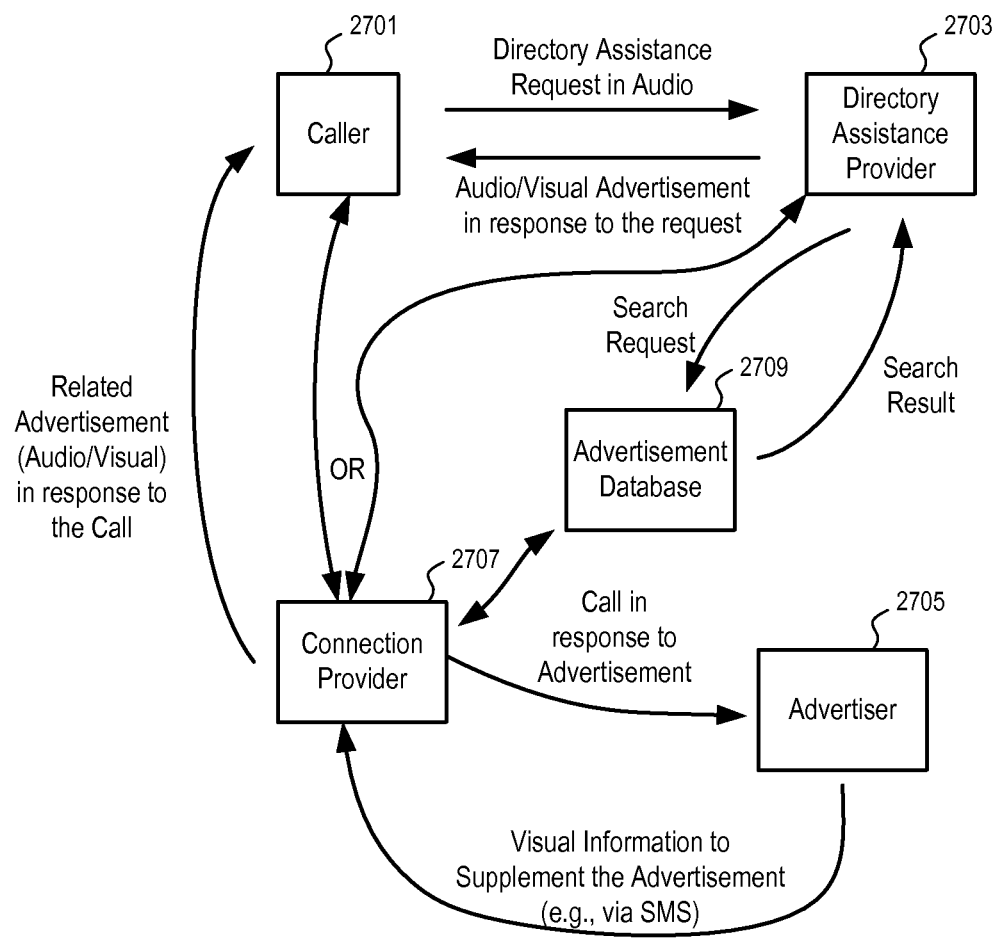
FIG. 27 illustrates an example of connecting a caller and an advertiser according to one embodiment.

FIG. 27 illustrates an example of connecting a caller and an advertiser according to one embodiment. In FIG. 27, a call is placed from a caller (2701) to a directory assistance provider (2703) (e.g., using a traditional telephone, a mobile phone, a cellular phone, a software-based phone, a USB phone, etc).

The directory assistance request is made in an audio format (e.g., via voice communications over a telephone connection). The service of directory assistance can be provided via a live operator or via an interactive voice response system. Based on the service request received from the caller (e.g., received from a mobile device, such as a cell phone), an advertisement can be provided to the caller in an audio form and/or in a visual form.

For example, when the caller asks for a car rental company during a directory assistance call, directory assistance information (e.g., the telephone number of the car rental company) can be provided to the caller via playing an audio clip, synthesizing a voice message from a text message, reading a text message by a human operator, or sending as SMS message by the directory assistance provider (2703). The directory assistance provider may query the advertisement database (2709) via a search request and receive the advertisement as a search result. After the advertisement is received from the advertisement database (2709), the directory assistance provider (2709) presents the advertisement to the caller (2701) via the phone connection with the caller (2701). Alternatively, the directory assistance provider (2703) may buffer the data stream for the advertisement and start to presenting the advertisement when a sufficient portion of the advertisement is buffered. In one embodiment, the directory assistance provider (2703) can pre-fetch a set of advertisements (e.g., based on statistics of query requests, or categories of advertisements) so that the audio advertisements can be cached for enhanced performance. For example, the sound files for the audio advertisements and/or other data, such as bid price, yield potential, etc., can be cached for improved performance in reducing data traffic between the directory assistance provider (2703) and the advertisement database (2709) and for improved performance in reducing the time needed to select an advertisement for presentation.

Alternatively, to provide the advertisement to the caller (2701), the phone call from the caller (2701) can be further connected to the connection provider (2707). For example, the directory assistance provider (2703) can make a separate connection to the connection provider (2707) and bridge or conference the connection with the caller (2701) and the connection with the connection provider (2707) to allow the advertisement to be delivered in real time from the connection provider (2707) to the caller (2701). Alternatively, the directory assistance provider (2703) may forward the call from the caller (2701) to the connection provider (2707) to allow the connection provider (2707) to present the advertisement to the caller (2701) directly.

In one embodiment, the search request for the advertisement is submitted to the connection provider via the phone connection between the connection provider (2707) and the directory assistance provider (2703). For example, the search request may be by the presented directory assistance provider (2703) as a string of audio signals (e.g., in DTMF) using the phone connection between the connection provider (2707) and the directory assistance provider. For example, the connection provider may use an IVR system or a human operator to obtain the search request from the directory assistance provider (2703). In one embodiment, the phone connection between the connection provider (2707) and the directory assistance provider (2703) also supports data transmission (e.g., in a VoIP call, or a multi-media session via an instant messaging network, or a custom network connection); and the search request can be submitted to the connection provider (2707) via digital data communications.

In one embodiment, the connection provider (2707) selects an advertisement according to the search request received from the directory assistance provider (2703) and the presents the advertisement to the caller (2701) via the connection arranged by the directory assistance provider (2703).

In one embodiment, the directory assistance provider (2703) monitors the presentation of the advertisement to the caller (2701) and any responses from the caller (2701). If the directory assistance provider (2703) detects that the caller (2701) provides a response to the advertisement to request a connection to the advertiser (2705), the directory assistance provider (2703) may hand the call completely over to the connection provider and disconnect from the call. For example, the directory assistance provider (2703) may leave the phone conference with the caller and the connection provider and/or forward the call to the connection provider (2707) which then further connects the caller to the advertiser (2705). If the directory assistance provider (2703) determines that the caller (2701) does not want to connect to the advertiser (2705), the directory assistance provider (2703) may disconnect the connection provider (2707) from the caller (2701) and continue with the directory assistance service.

In one embodiment, after the caller (2701) is connected to the directory assistance provider (2703), the directory assistance provider (2703) conferences the connection provider (2707) into the call to allow the connection provider to receive a portion of the communications from the caller (2701). Based on the portion of the communications received from the caller (2701) (e.g., the directory assistance request submitted by the caller 2701), an advertisement can be selected for presentation to the caller (2701) (e.g., via the conference call with the caller), while the directory assistance provider (2703) works on the directory assistance request from the caller.

Thus, in one embodiment, the directory assistance provider (2703) can work on the directory assistance request, while an advertisement provider (not shown in FIG. 27 in general, but could be the same entity as the connection provider in one embodiment) who is connected to the connection provider (2707) can work in parallel on the directory assistance request to select a advertisement (e.g., to supplement the directory assistance). The advertisement provider may determine a context of the call and provide an advertisement that is relevant to the directory assistance call.

The directory assistance provider (2703) and the advertisement provider may communicate with each other (e.g., via the phone connection between the connection provider 2707 and the directory assistance provider 2703, or via a separate connect) to coordinate the advertisement services and the directory assistance services.

For example, the advertisement provider may monitor the conversation between the caller (2701) and the directory assistance provider (2703) to determine an opportunity for advertisement and select an appropriate advertisement based on the monitored conversation. The conversation may be monitored by a speech-recognition system, "listening" for keywords that will, in turn, help determine which advertisements should be played either on this call or subsequent interactions. When an advertisement is selected by the advertisement provider, the advertisement provider may signal to the directory assistance provider (2703) to request an arrangement for the presentation of the advertisement. When the directory assistance provider (2703) finds an appropriate time instance for the presentation the advertisement, the directory assistance provider (2703) then signals the advertisement provider to start presenting the advertisement.

For example, during a non-advertisement period, the advertisement provider is connected to the caller (2701) in a half-duplex mode, in which the advertisement provider can listen to what the caller says but not talk to the caller (2701). When the advertisement is ready for presentation, the directory assistance provider (2703) can switch the connection into a full-duplex mode for an advertisement period, during which the advertisement provider and the caller (2701) can communicate with each other in full-duplex.

Alternatively, the directory assistance provider (2703) may buffer the voice input from the caller and transmit the buffered voice input to the advertisement provider to allow the advertisement provider to select an advertisement. In one embodiment, the directory assistance provider (2703) converts the voice input from the caller into text via speech recognition and provide the text to the advertisement provider to search for a matching advertisement.

In one embodiment, the directory assistance provider (2703) maintains an audio connection with the connection provider (2707) to receive the audio advertisement; and a separate data channel to the advertisement database (2709) is used to request the audio advertisement. For example, the search request can be submitted to the advertisement database (2709) via a web site to request that an audio advertisement be presented in the audio channel between the connection provider (2707) and the directory assistance provider (2703). The directory assistance provider (2703) then mixes the audio signals received from the connection provider into the phone connection between the caller (2701) and the directory assistance provider (2703). The connection between the connection provider (2707) and the directory assistance provider (2703) may be at least partially packet switched and/or at least partially circuit switched.

In one embodiment, the advertisement is provided to the caller (2705) in an audio form. For example, in addition to the directory assistance, an advertisement, such as a pay per call advertisement, is delivered to the caller, in voice by a human operator or via an IVR system. The directory assistance provider (2703) sends a search request based on the directory assistance request. An advertisement database (2709) is searched to obtain one or more advertisements that satisfy the search request. In one embodiment, the advertisement is maintained by an entity separate from the directory assistance provider (2703); and the directory assistance provider (2703) uses an application programming interface (API) to invoke a method to perform the search. Alternatively or in combination, the directory assistance provider (2703) may search an advertisement database that is maintained by the directory assistance provider (2703). In one embodiment, an API returning the advertisement search results in an audio form is used. In one embodiment, the advertisement is retrieved in a text format (e.g., via an XML file) and converted into an audio format (e.g., via a data processing system using a text to speech technique, or via an operator).

In one embodiment, the audio advertisement is delivered to the caller (2701) in the phone connection in which the directory assistance request is received (e.g., before the answer to the directory assistance request is received). When the caller (2701) selects to call the advertiser, the directory assistance provider (2701) forwards the call to the connection provider (2707) who further connects the caller and the advertiser (2705) (e.g., by bridging the call from the caller and a separate call to the advertiser (2705). In one embodiment, the call is forwarded to the connection provider (2707) at a phone number (e.g., a traditional phone number with or without an extension, or a SIP address for VoIP) that is assigned to the advertiser. The connection provider (2707) identifies the advertiser based on the phone number at which the forwarded call is received. After the call is forwarded, the directory assistance provider (2701) is no longer on the phone line with the caller. Alternatively, the directory assistance provider (2701) may make a separate call to the connection provider, or to the advertiser (2705) directly, to connect the caller (2701) and the advertiser (2705).

In another embodiment, the advertisement is provided to the caller in a visual form. For example, an advertisement can be delivered to the caller via SMS, email, WAP, or web, or other types of communications for visual presentation to the caller. In one embodiment, the advertisement is delivered to the caller for visual presentation at the cell phone. In one embodiment, advertisements can be delivered in a combined visual and audio form. For example, a short audio advertisement can be delivered with a more detailed visual advertisement for an advertiser. For example, an audio advertisement can be delivered to the caller for one advertiser; and a visual advertisement can be delivered to the caller for another advertiser.

In one embodiment, a short version of the advertisement is presented in the audio communication channel in which the directory assistance request is received; and a full version of the advertisement is transmitted in a separate channel for visual presentation to the caller. In one embodiment, the visual version is transmitted after the audio version is presented (e.g., after the caller indicates that the caller is interest in the visual advertisement based on the audio advertisement.)

In one embodiment, the advertisement delivered to the caller is relevant to the directory assistance request received from the caller. For example, an advertisement of the car rental company requested by the caller or an advertisement of another car rental company can be presented. For example, an advertisement for a travel agency can be presented. Alternatively, a randomly selected advertisement may be delivered to the caller.

In one embodiment, an identity of the caller or the device used by the caller (e.g., the cell phone) is identified based on the connection the caller used to submit the directory assistance request. For example, based on the call received from the caller (2701), the telephone number of the cell phone of the caller can be identified. Based on the identified telephone number, a channel to deliver the advertisement for visual presentation can be determined.

For example, a short message service (SMS) message can be sent to the cell phone once the telephone number of the cell phone is determined. The SMS message may include the advertisement, or include a link to, or a URL of, a web/WAP page that contains the advertisement. Alternatively, the telephone number can be used to look up an email address of the caller from a preference database to send the advertisement via email. Other communication channels such as instant message, multimedia messaging service (MMS) message, etc., can also be used to deliver the advertisement.

In one embodiment, the advertisement is delivered for presentation on the same device that the caller (2701) used to make the directory assistance request in audio. Alternatively, the advertisement is delivered for presentation on a separate device according to a preference of the caller. For example, during the directory assistance call, the caller may be prompted to provide a communication reference at which the caller wants to receive the advertisement. For example, after receiving the directory assistance request, the caller may be presented with the option to receive an advertisement on the mobile phone via an SMS message, or at a different address (e.g., at an email address, at instant messaging user ID, etc.). The user may provide the answer via voice or via key pad input.

In one embodiment, the communication connection used for receiving the directory assistance request may support communications in a multi-media format. For example, a VoIP based telephony device may be used by the caller to request the directory assistance. The communication connection made by the VoIP based telephony device allows not only the audio communications between the caller (2701) and the directory assistance provider (2703) but also visual communications for the presentation of the advertisement.

In one embodiment, the advertisement can be presented as a text message, an image, a web/WAP page, a video stream, an audio clip, etc. In one embodiment, a custom application running on the device of the caller is used to receive and present the advertisement at least partially in a visual form and/or at least partially in an audio form.

In one embodiment, the advertisement is sent from the directory assistance provider (2703) during the directory assistance call. Alternatively, the advertisement may be sent at least partially after the directory assistance call (e.g., after the user selects a link in an SMS or email message). The advertisement may be sent via a real time communication, or a non-real time communication.

In one embodiment, the visual advertisement includes a communication reference which can be used to request a connection provider (2707) to provide a real time communication connection between the caller (2701) and the advertiser (2705) of the advertisement. Further, in one embodiment, the visual advertisement includes a communication reference which can be used by a connection provider (2707) to further deliver visual content to the caller (2701) (e.g., to deliver the visual content in the same way as the advertisement is delivered to the caller). In one embodiment, a communication reference can be used by the connection provider (2707) to identify both the caller (2701) and the advertiser (2705).

In one embodiment, when a call is placed as a response to a pay per call advertisement that is presented to the caller (2701) in a visual format (e.g., in an SMS message, an email, a WAP or web page) on a mobile device (e.g., a PDA, a cellular phone, a mobile phone, etc.) or other devices, additional visual information can be presented to the caller (2701).

For example, using the communication reference embedded in the advertisement, the caller (2701) can request the connection provider (2707) to make a real time communication connection with the advertiser (2705). The connection provider (2707) can identify the advertiser (2705) based on the communication reference used to make the request and connect the call to the advertiser accordingly.

The communication reference can be one of the phone numbers of the connection provider (2707), which is assigned to the advertiser. When the connection provider (2707) received a phone call at the phone number that is assigned to the advertiser, the connection provider (2707) can further connect the call to the advertiser. Alternatively, the communication reference may be one of the Session Initiation Protocol (SIP) addresses of the connection provider (2707), which can be used by the caller to call the connection provider (2707) via VoIP to request the phone connection to the advertiser. In one embodiment, the communication reference includes a link which when selected causes the connection provider to present an interface (e.g., a web page) to collect information for the connection provider (2707) to call back the caller (2701), call the advertiser (2705) separately, and join the separate connections to connect the caller (2701) and the advertiser (2705).

In one embodiment, the communication connection provided between the caller (2701) and the advertiser (2705) supports multi-media communications. For example, in addition to real time audio communications between the caller (2701) and the advertiser (2705), the communication connection can also support visual communications, such as text, image, video, shared application, common whiteboarding, file transfer/sharing, etc. Thus, the advertiser (2705) can use the communication connection to provide visual information that supplements the advertisement. For example, the advertiser (2705) can provide electronic coupons, special promotions, electronic brochures, etc. to the caller (2701).

In one embodiment, the communication connection provided between the caller (2701) and the advertiser (2705) supports audio communications. A separate communication channel is used to provide the visual information to supplement the advertisement. For example, the advertiser (2705) may provide the supplemental information via an SMS message, an email message, an instant message, a web/WAP page, and/or a message for presentation by a custom application program, etc.

In one embodiment, the advertisement includes multiple communication references which allow the caller (2701) to request the connection provider (2707) to provide multiple types of communication connects to the advertiser (2705) for multi-media communications (e.g., one for two-way real time audio, one for video conferencing, one for instant messaging, etc).

In one embodiment, when the connection provider (2707) makes a connection to the advertiser (2705), a communication reference is sent to the advertiser (2705) to allow the advertiser (2705) to send visual information to the caller.

For example, the connection provider (2707) may send an audio message to inform the advertiser about the communication reference, such as a phone number, a SIP address, an email address, an instant messaging user ID, a URL, a reference number, etc. The communication reference can be used to request the connection provider to communicate the supplied visual information to the caller (2701).

Alternatively or in combination, the connection provider (2707) can also provide the advertiser an email, an SMS message, an MMS message, an instant message, etc., to inform the advertiser about the communication reference for the caller (2701).

For example, the connection provider (2707) may provide an SMS message to the advertiser (2705) with a return address that is assigned to the caller (2701). When the advertiser replies to the SMS message to the return address, the connection provider (2707) receives the SMS message and delivers the message to the caller (2701).

For example, the connection provider (2707) may provide an email message to the advertiser (2705) with a return address that is assigned to the caller (2701). The advertiser (2705) can email the caller (2701) via the connection provider (2707) using the return address. In one embodiment, the return address is an email address of the connection provider (2707), which when receives an email message retransmits the message to the caller (2701) based on an association relation between the return address and the caller (2701). In one embodiment, the association relation is stored in a database of the connection provider (2707) and is generally kept in confidence from any third party.

For example, the connection provider (2707) may provide an email message to the advertiser (2705) with a link to a web page. The link includes a reference that can be used by the connection provider (2707) to identify the caller (and the advertiser in one embodiment). Using the web page gateway, the advertiser (2705) can submit visual information to the connection provider (2707) which can further transmit the information to the caller (2701). For example, the connection provider (2707) may transmit the visual information to the caller via an SMS message, an email, a web/WAP page, and/or a message to a custom application, etc.

In one embodiment, the connection provider (2707) can receive visual information from the advertiser (2705) in one format and provide the information to the caller (2701) in another format (e.g., based on the preference of the caller and/or the advertiser). For example, the connection provider may receive the visual information via a web gateway and transmit the visual information via an SMS message, an email, a web/WAP page, or a combination of these. For example, the connection provider may receive the visual information via an email and transmit the visual information to the caller via SMS.

In one embodiment, when the connection provider (2707) receives the request for a real time communication connection with the advertiser (2705), the connection provider (2707) automatically determines a communication reference to provide visual information to the caller (e.g., based on the phone number from which the connection provider receives the request, a SIP address of the caller, etc.).

In one embodiment, when the connection provider (2707) provides a web page to the caller (2701) to request for a call back phone number for a connection to the advertiser (2705), the connection provider (2707) also collects one or more communication references for the caller (2701) to receive visual communications from the connection provider (2707).

In one embodiment, the advertisement is for a paid phone call, such as computer help at $19.99 for 15 minutes. If the caller selects this advertisement, payment can be collected from the caller; and the caller is then subsequently connected to the available computer help advertiser who would be earning fees from the payment made by the caller.

Visual communications from the connection provider (2707) can be used by the connection provider to provide step-to-step help information to guide the caller through the process of connecting to the advertiser (2705). For example, the visual communications may further include a call graph to show the current status of the connection, the current availability of the advertiser, etc. Further, visual communications may include supplemental information forwarded from the advertiser.

In one embodiment, the caller (2701) requests the real time communication connection with the advertiser (2705) via audio communications (e.g., by call a telephone communication reference that is assigned to the advertiser (2705)). The connection provider (2707) prompts the caller for one or more other communication references at which the caller will accept visual communications. The caller may provide the visual communication references via voice input or key pad input.

In one embodiment, when the connection provider (2707) connects the caller (2701) to the advertiser (2705), the connection provider (2707) also provides to the advertiser (2705) the information on the types of different media communications the caller accepts or prefers. Thus, the advertiser (2705) may use appropriate multi-media communications to optimize the communication effort with the caller (2701).

In one embodiment, the connection provider (2707) may also presents to the caller (2701) the list of different media types that are acceptable to the advertiser (2705). Thus, the caller (2701) may prepare the communication device for optimized communication with the advertiser.

In one embodiment, the caller can also be presented with communication references to provide visual information to the advertiser (2705), in a way similar to that described above for the advertiser (2705) to provide supplemental information to the caller (2701).

In one embodiment, the communication reference provided to the advertiser (2705) by the connection provider (2707) is valid for sending visual information within a limited time period, such as within the time period of the real time communication connection between the caller (2701) and the advertiser (2705), or before the expiration of a pre-determined time period after the real time communication connection between the caller (2701) and the advertiser (2705). In one embodiment, after the limited time period, the visual information submitted from the advertiser (2705) to the connection provider (2707) is not forwarded to the caller (2701). In one embodiment, the time period is customizable by the caller (2701) during the request for the real time communication connection between the caller (2701) and the advertiser (2705).

In one embodiment, the connection provider (2707) may also send additional advertisement information to the caller (2701), in response to the caller (2701) requesting a real time communication connection with the advertiser (2705).

For example, the connection provider (2707) may provide supplemental information that is part of the advertisement. The supplemental information is designed to be delivered after the caller (2701) indicates that the caller (2701) is interested in the advertisement (e.g., by calling the communication reference embedded in the advertisement). Alternatively, a separate advertisement can be selected and delivered to the caller (2701) based on the indication that the caller (2701) is interested in the advertisement that the caller (2701) is calling.

In one embodiment, the directory assistance provider (2703) and connection provider (2707) are separate entities. Alternatively, the directory assistance provider (2703) and connection provider (2707) may be the same entity.

In one embodiment, the advertiser may answer live or answer with an IVR system; and the advertiser may send visual response (e.g., supplemental information, special promotion, electronic coupon, etc.) to the caller based on the telephone connection from the caller. The visual response can be sent via SMS, email, WAP or web pages via the connection provider. Alternatively, the connection provider may provide communication references to the advertiser (2705) to allow the advertiser (2705) to subsequently send visual responses to the caller (2701) without going through connection provider (2707).

In one embodiment, the advertising party is charged for the advertisement according to a count of real time communication leads connected to the advertising party. A communication lead can be a telephone call, or other types of calls for a communication connection, such as an initiation of the communication session (e.g., via SIP or other types of communication protocols). A communication lead may also be an email, a voice mail, an SMS message, etc.

In one embodiment, an audio advertisement is generated by converting a text version of an advertisement into an audio message. For example, the content of the advertisement can be created and submitted by the advertiser, or by a copywriter on behalf of the advertiser (e.g., based on the information submitted from the advertiser).

For example, an existing pay-per-call advertisements can be read by a voice actor to create the corresponding audio advertisement. For example, the content of the advertisement can be submitted to the advertisement database in text; and a data processing system can be used to convert the text into an audio message via a text-to speech synthesizer; alternatively, a human can read the content on behalf of the advertiser to generate an audio recording.

In one embodiment, an advertiser can make an arrangement to record an audio advertisement in an audio files, which is then uploaded into the advertisement database (e.g., via a web server, a file server, or via email attachment or via a multi-media message, etc.). In one embodiment, the advertiser may make an audio connection with the system to allow the system to record a voice message over the audio connection as the audio advertisement (e.g., recording over a phone connection between the system and the advertiser).

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer) when the audio advertisement is needed. In one embodiment, the machine synthesized audio recording are stored in the database for a period of time and deleted if not used after a predetermined period of time, or when the usage of the audio advertisement is lower than a threshold.

In one embodiment, the advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, a short audio advertisement is based on the concise marketing message (e.g., two sentences, each having a length limit, such as 35 characters). The concise marketing message can be read by a human to generated a recorded audio file for the short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. The visual component of the advertisement can be sent to the customer via an SMS message (e.g., in response to a request from the customer), via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web, the short audio advertisement can also be included; and the audio advertisement is played automatically or after the user selects the advertisement.

In one embodiment, the advertisement is charged based on a count of communication leads (e.g., telephone calls, or communication sessions) generated from the advertisement. For example, the communications to the advertiser can be monitored to charge for the advertisement in a pay per call format.

Alternatively, the advertisement can be paid based on subscription, in which the advertiser subscribes to have their advertisements played in relevant environments. For example, a subscription can be offered to a movie studio for $10,000 per month to have a movie trailer audio advertisement played for the movie studio when customers are exploring a film category area in a media channel.

In one embodiment, the price for the subscription is based on past performance of the advertisement, or the past performance of advertisements in a particular categories; and the performance of the advertisement or advertisements can be determined based at least in part on the communication leads generated from the advertisement. In one embodiment, the subscription price can be changed periodically according to the most recent statistic data related to the performance of the advertisement.

In one embodiment, the subscription price is based on a range of anticipated performance of the advertisement. For example, the system may offer to deliver at least 100 calls, 200 calls, 260 calls, etc., for a subscription period (e.g., a week or a month); and an advertiser may select a level for 100 calls generated from the advertisement for subscription. The system then attempts to present advertisements in one or more media channels to generate at least 100 calls for the advertiser for the subscribed month. The subscription fee may be specified by the advertiser (e.g., as a price bid for the subscription), or specified by the system (e.g., based on a cost and revenue analysis).

In one embodiment, the actual subscription fee that is paid by the advertiser is determined after the subscription time period and based at least in part on the communication leads generated during the subscription period. For example, when the system failed to deliver the anticipated number of phone leads, the subscription fee may be reduced (e.g., according to a pre-determine schedule). Alternatively, the system may offer guaranteed performance of the subscription.

In one embodiment, the subscription fee for the advertisement is bundled with the subscription for the communication service. For example, a telephone number (e.g., a local phone number or a toll free number) may be assigned to the advertiser such that phone calls to the assigned phone number will be forwarded to a phone number of the advertiser, or connected directly to the advertiser's phone line. During the subscription period, the advertiser may also use the telephone number for other purposes other than advertising. Advertisements are then presented on behalf of the advertiser in a such way that the telephone calls generated in response to the advertisements are connected to the phone number of the advertiser, or connected directly to the advertiser's phone line. Thus, the subscription includes the advertising service and telecommunication service.

In one embodiment, the subscription fee is at least partially based upon the performance of the advertisement in terms of communication leads delivered. For example, a basic level of subscription may include telecommunication service without the advertising service; and a high level of subscription includes the telecommunication service and guaranteed delivery of an amount of communication leads generated through advertising on behalf of subscriber.

In one embodiment, the system may charge for the advertisements based on impression, in which the advertiser pays a price every time an advertisement is presented. The movie studio, for instance, may agree to pay $0.50 every time the movie trailer advertisement is played to a listener. In one embodiment, the price the advertiser pays for each presentation of the advertisement is based on the performance of the advertisement and/or the performance of advertisements the same category. For example, the conversion rate of the advertisement and an average pay per call bid (e.g., top 3 bids) for the advertisements of the same category can be used to compute a pay per presentation price for the advertisement of the movie studio; alternatively, the conversion rate of the advertisements of the same category can be used to determine the pay per presentation price. Alternatively, the pay per presentation price can be specified by the advertiser directly; and the system can convert the pay per presentation price into an equivalent pay per call price based on the conversion rate of the advertisement.

In one embodiment, the system may charge for the advertisements based on a proxy for calls. Using statistical methods, the system can estimate how many calls are connected between advertisers and end users. For example, the system may track the number of times a communication reference that is assigned to the advertiser is presented to a customer or being requested by a demand partner for presentation to the customer, to estimate the number of calls connected to the advertiser. Such a method is particularly useful if the exact count of calls is difficult to determine.

Figure 28:
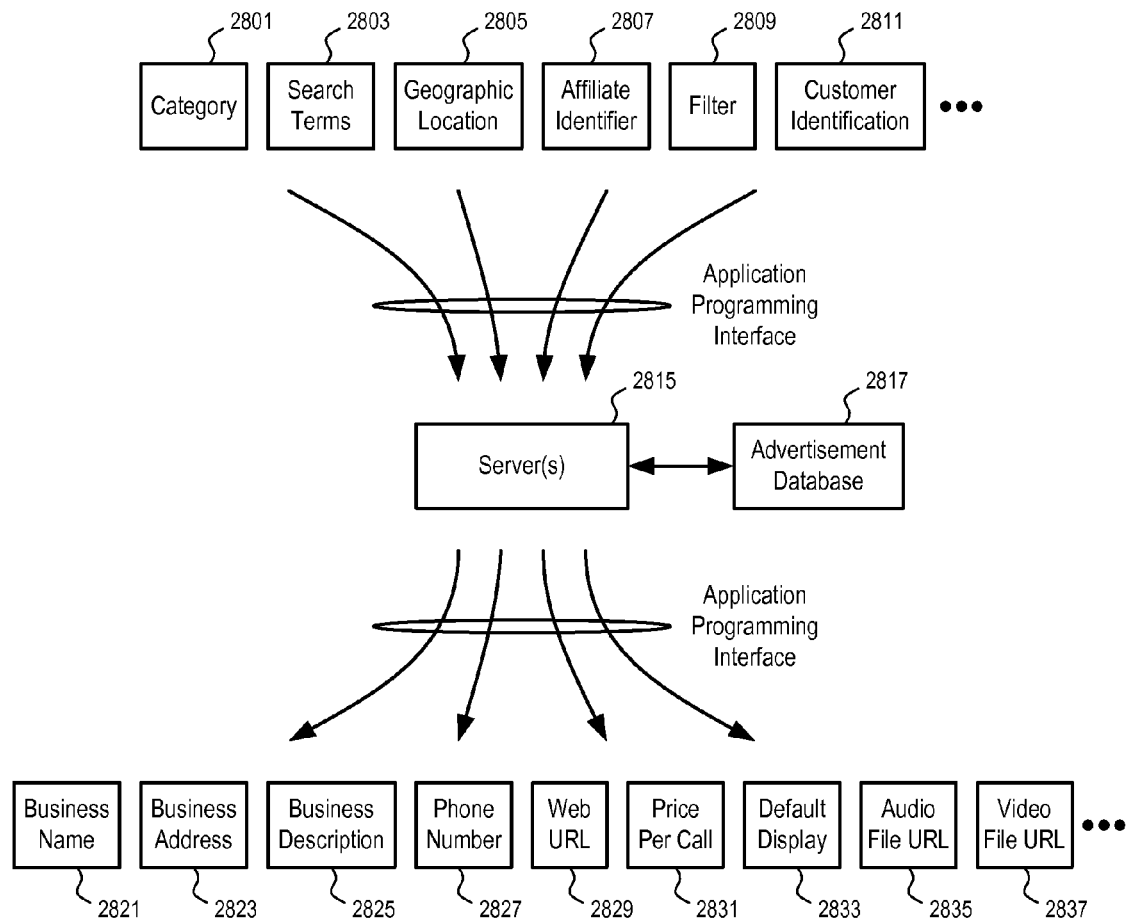
FIG. 28 illustrates an application programming interface to provide pay per call advertisements according to one embodiment of the present invention.

FIG. 28 illustrates an application programming interface to provide pay per call advertisements according to one embodiment of the present invention. In FIG. 28, an application programming interface is provided to facilitate the development of client applications (not shown in FIG. 28). Through the application programming interface, the client applications can access the server(s) (2815) to query the advertisement database (2817). In one embodiment, the server(s) (2815) includes web service servers, listing (advertisement) servers, and reference allocation servers. The web service servers are used to receive request from client applications via web and to provide listing information via web. For example, the advertisement information (e.g., 2821-2837, . . . ) can be provided via an XML data document that is generated in response to the received web request. The listing (advertisement) servers are used to determine or identify the requested listing information in response to the requests that are received via the web service servers; and the reference allocation servers are used to allocate the communication references (e.g., assigned telephone numbers or click-to-call references) for the listing information that is to be provided via the web as a response. In one embodiment, the advertisement database (2817) is stored on one or more database servers and cached in the memory of the listing (advertisement) servers. The listing (advertisement) servers communicate with the database servers to obtain the current advertisement data. The advertisement database (2817) may be implemented using a non-volatile file system, a volatile random access memory system, or a combination of non-volatile and volatile memory systems. Further, the server(s) (2815) can be implemented as one combined server, or as multiple cooperating servers hosted on one or more data processing systems. Using the server(s) (2815), client applications can query the advertisement database (2817) through an application programming interface.

In one embodiment, to search for one or more advertisements, a client application can specify one or more fields/parameters using the application programming interface, such as category (2801), search terms (2803), geographic location (2805), affiliate identifier (2807), filter (2809), customer identification (2811), etc. A client application can specify values for a subset of the fields/parameters illustrated in FIG. 28. An alternative embodiment may include more or less fields/parameters.

For example, the application programming interface can be an interface for a remote procedure call (RPC) implemented via a web service (e.g., based on Simple Object Access Protocol (SOAP) or the GET method of Hypertext Transfer Protocol (HTTP)). In response to the remote procedure call and the parameters specified according to the interface, the server(s) (2815) searches advertisement database (2817) and returns a list of one or more advertisements. In one embodiment, the advertisement database (2817) is hosted on a database management server, which can be searched using a standard language (e.g., a Structured Query Language (SQL)). For example, the server(s) (2815) may query an SQL server to obtain a list of one or more advertisements. In another embodiment, the advertisement database (2817) is loaded in the random access memory of one or more of the servers (2815), which can perform a search using the data loaded in the random access memory without querying a database management server (e.g., an SQL server). In one embodiment, the advertisement database (2817) is loaded into a volatile memory from a non-volatile storage facility (e.g., an SQL server) and synchronized in changes with the non-volatile storage facility.

In one embodiment, the category field (2801) can be used to specify a category of products or services that is being requested by a customer. In one embodiment, the request is received from a customer via a demand partner; the category (2801) is characterized by the demand partner based on the demand partner's understanding of the need of the customer; and the search terms (2803) are the original keywords used by the customer in their request, without being interpreted or mapped by the demand partner.

In one embodiment, the application programming interface allows the client application to specify the geographic location (2805) from which the customer is seeking a product or service. The geographic location (2805) can be specified as a country, a state, a city, a postal code, coordinates (e.g., latitude and longitude). In one embodiment, when the geographic location is not explicitly specified, the search terms (2803) are parsed to look for indication of the target service area; and when no geographic location can be identified from the input fields, the advertisement server may filter out the advertisements for specific local areas in the search.

In one embodiment, an affiliate identifier (2807) can be used to track the source of the request. For example, the affiliate identifier (2807) can be used to identify a demand partner such that the phone number (2827) is assigned accordingly to track the contribution of the demand partner. Alternatively, the source of the request can be identified based on a communication address used to make the remote procedure call.

The affiliate identifier (2807) can also be used to track a number of parameters for the demand partner. For example, the demand partner can use the affiliate identifier to associate a number of parameters with the request; and when the customer responds to the advertisement by calling the advertiser, the call can be associated with the affiliate identifier and thus the parameters of the demand partner. For example, the demand partner's parameters can be provided as an encrypted string in the extension part of the affiliate identifier; or the extension part of the affiliate identifier may include a key that can be used by the demand partner to look up the parameters in its database.

In one embodiment, the filter (2809) allows the client application to filter outs certain types of advertisements from the search. For example, a filter may be requested to filter out advertisements that advertise adult services or products. For example, a filter may be requested to filter out local advertisers, or national advertisers. For example, a filter may be requested to filter out advertisements from a specific company, or a specific category, or a specific product or service, or a specific advertisement.

In one embodiment, the search is for pitch switching or cross selling; and a filter can be requested to filter out advertisements that are on different economical levels or different quality levels. In one embodiment, when the search is for pitch switching, the advertisement server filters out the advertisements by the same corporation mentioned in the directory assistance request and filters out the advertisements that are not in the same economical and/or quality level of that corporation.

In one embodiment, the request includes an identifier of the requesting client application (e.g., an Internet Protocol (IP) address of the requesting client application, an telephone number of the requester determined via ANI, a hardware serial number of the requester, etc.); and the advertisement server performs security check (e.g., trust and safety verification) using the identifier of the requesting client application (e.g., the IP address, telephone number, hardware serial number).

In one embodiment, the server(s) (2815) returns one or more components of the advertisement that is in the resulting list according to the application programming interface. For example, the server(s) (2815) may return the business name (2821), business address (2823), business description (2825), phone number (2827), web URL (2829), price per call, (2831), default display (2833), audio file URL (2835), and/or video file URL (2837), etc.

In one embodiment, one or more components of the advertisements are return in a text format (e.g., in separate fields in an XML format); and thus, the client application can be programmed to present the advertisement in a way independent from the advertisement server. For example, the client application can be programmed to selectively use some of the components to assemble a particular presentation. For example, the client application can selectively convert some of the returned text fields into an audio message (e.g., via a text-to-speech synthesizer). For example, the client application may apply a formatting template (e.g., font, font size, font effect, etc.) to the text components to provide a uniform appearance of advertisements.

In one embodiment, the business name (2821) is used to present the name of the advertising party (e.g., seller, adviser, advertiser, service provider); the business address (2823) is used to present the street address of the advertiser; the business description (2825) provides a few sentences of marketing message for the advertiser, which may include a promotional offer to convince/persuade the customer to call the advertising party.

In one embodiment, the phone number (2827) is a phone reference that is assigned by the system to track the customer responses to the advertisement. The phone number (2827) can be a telephone number with or without an extension, or a phone reference for the initiation of a VoIP call, such as a session initiation protocol (SIP) uniform resource identifier (URI). In one embodiment, the phone number (2827) is associated with a set of parameters in the database, such as the advertiser's phone number, the demand partner, the supply partner, etc. When the phone number is dialed, the call is connected to a connection provider/tracker (e.g., a telephony facility and/or server operated by Ingenio), which can look up the advertiser's phone number using the dialed phone number as a key.

Alternatively or in combination, the phone number (2827) can include an encoded/encrypted set of parameters, which can be decoded/decrypted without having to look up the parameters from a database. For example, the parameters can be encoded/encrypted in the extension part of the phone number; or the user identifier portion of the SIP address can contain an encrypted string that can be decrypted into the parameters. Further, for example, one of the parameters decrypted from the string may be used to look up other parameters; or the encrypted phone number can be used as a key to look up other parameters.

In one embodiment, in addition to the tracking of the advertisers who receive the communication leads as a result of the advertisements and the demand partners who are creditable for the opportunity of targeting the advertisement at the customer, the advertisement server can further associate the phone number (2827) with parameters such as an identifier of a supply partner who is creditable for bringing in the advertiser, information of the customer who is going to receive the advertisement (e.g., the IP address of the customer, the phone number of the customer, a user ID of the customer), the search terms used by the customer, the categories characterized by the demand partner, the date of the search that results in the delivery of the advertisement, the keywords that cause the advertisement to be selected in the search, the product or service specific to the request, the position of the advertisement in the ordered list of advertisements that are returned as the result of the search, etc. The tracked information can be used to improve the selection of advertisements in response to search requests. The tracked information can be used to correlate queries from demand partners with calls made from customers.

In one embodiment, a click-to-call reference can be used in the place of the telephone number to track the communication leads generated from the advertisements. When the click-to-call reference is used, a customer is presented with a button or icon or link, which when selected causes a message to be sent to a connection provider/tracker. The click-to-call reference identifies advertiser's phone number; and the customer provides the phone number to call back the customer. Thus, by calling both the advertiser and the customer, the connection provider/tracker can make the connection for the customer and track the communication leads delivered to the advertiser.

In one embodiment, a click-to-assign reference can be used in the place of the telephone number. The reference is associated with the advertiser; and a button or icon or link with the click-to assign reference is selected, the reference is transmitted to the server to request for the telephone number that is assigned to the advertiser. This arrangement can postpone the need for a separate telephone number for the tracking of the communication lead until the explicit request from the customer.

In one embodiment, when a communication between a customer and an advertiser is facilitated via the phone number (2827), at least a portion of the communication goes through a tracker such that the communication leads generated by the advertisement for the advertiser can be tracked (e.g., to determine the performance of the advertisement and/or to bill the advertiser based on the count of communication leads).

In one embodiment, the web URL (2829) is used to point to a web page that can provide further details about the advertiser and/or the advertisement. For example, a web page hosted on the server(s) (2815) can be used to provide further details on the advertisement, such as the detailed specifications of the products or services offered, user feedback, etc. In one embodiment, a combined server is used to identify the advertisement and to provide the web page. In another embodiment, separate, distinct servers are used to identify the advertisement and to provide the web page. Alternatively, the web URL (2829) may point to a web page that is maintained by the advertiser.

In one embodiment, the advertisement is at least charged for according to a price per call (2831) which is specified by the advertiser. The price per call (2831) can be used by a demand partner to selectively present or prioritize the returned advertisements.

In one embodiment, the server(s) (2815) also provides a default display (2833) of the advertisement. The default display (2833) may be provided in a plain text format, a rich text format, or an HTML format. In one embodiment, the request received via the application programming interface includes a requested format for the default display; and the advertisement server provides the default display according to the requested format.

In one embodiment, the advertisement may include an audio version or an audio component; and the server(s) (2815) provides the audio file URL (2835) of the audio version/component to allow the client application to retrieve the audio file separately from the response (e.g., for improved performance). For example, a client application may pre-fetch the audio component or cache the audio component from previous request. If the audio component is already in the cache of the client application, the re-transmission of the audio component to the client application can be eliminated.

In one embodiment, the client application can determine whether is a change to the cached audio component by examining the audio file URL (2835). For example, after an audio file for an advertisement is changed, the audio file URL (2835) is also changed. Thus, the client application can compare the audio file URL (2835) and URL of the cached version of the audio file to determine whether there is a need to re-load the audio file. In one embodiment, the request may include a requested format (e.g., wav, mp3, Ogg Vorbis, AC-3, MPEG-4, RealAudio, etc.) for the audio file; and the server(s) filters the advertisements based on the requested format, or converts the audio files into the requested format for the client application.

In one embodiment, the advertisement may include a video version or a video component; and the server(s) (2815) provides the video file URL (2835) of the video file to allow the client application to retrieve the video file separately from the response (e.g., for improved performance). In one embodiment, the request may include a requested format (e.g., MPEG, DVIX, H.263, WMV, etc.) for the video file; and the server(s) filters the advertisements based on the requested format, or converts the video files into the requested format for the client application.

In one embodiment, the advertisement may include an image version or an image component (e.g., logo); and the server(s) (2815) provides the image file URL to allow the client application to retrieve the image file separately from the response (e.g., for improved performance). In one embodiment, the request may include a requested format (e.g., JPG, GIF, TIF, etc.) for the image file; and the server(s) filters the advertisements based on the requested format, or converts the images into the requested format for the client application.

In one embodiment, the response to the remote procedure call includes an identifier of the advertisement. The identifier can be used to determine whether one or more components of the advertisement is already in the cache of the client application. In one embodiment, the identifier can be used to check for updates to specific components of the advertisement. For example, the client application may use the identifier to check whether an audio/video component is in the cache and remove the older version of the audio/video component when a newer version is available.

In one embodiment, the identifier of the advertisement is specific to the advertisement listing from the point of view of the advertisers; and the identifier of the advertisement is not specific to the parameters to be tracked, such as the demand partner, the keywords used in the search, the date of the search, etc.

In one embodiment, the request received via the application programming interface indicates whether the advertisements are retrieved for caching, or for presentation to a customer. For example, the client application can search for advertisements that are likely to be presented, cache the advertisements, especially large components of the advertisements (e.g., the audio, video, image files), before the opportunity for advertising to a customer arrives. Such an indication allows the advertisement server to count presentations of advertisements precisely, while allowing the caching of the advertisements.

Alternatively, a client application may report the presentation of an advertisement via a separate communication with the advertisement server; and the advertisement server may not count the presentations of advertisements based on the search requests.

Figure 29:
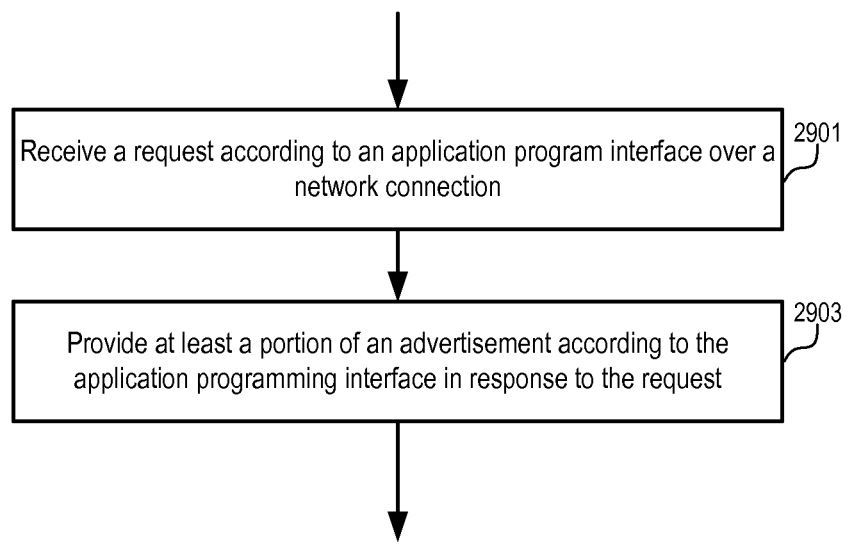
FIG. 29 shows a method to provide pay per call advertisements according to one embodiment of the present invention.

FIG. 29 shows a method to provide pay per call advertisements according to one embodiment of the present invention. In FIG. 29, after a request is received (2901) according to an application program interface over a network connection, at least a portion of an advertisement is provided (2903) according to the application programming interface in response to the request. In one embodiment, the advertisement is presented to customers to generate communication leads for a party (e.g., a seller, adviser, advertiser, or service provider); and the party is to be charged for the advertisement according to a count of communication leads generated for the party via the advertisement.

For example, a name of the party, a street address of the party, a description of the advertisement, a bid price for communication leads for the advertisement, a link to an audio component, a link to a video component, and/or a default display of the advertisement can be provided through the application programming interface in separate fields.

In one embodiment, a communication reference is provided with the advertisement; and communication leads generated from the advertisement are counted via the communication reference. For example, the communication reference can be a phone number, which may include a country code, an area code, an extension, or a session initiation protocol (SIP) uniform resource identifier (URI).

In one embodiment, an advertisement database is searched according to the request to identify the advertisement. The request may include a keyword, a category, and/or a geographic location.

In one embodiment, the request is received from a partner on behalf a customer. The request may include an identifier associated with the partner and an identification representing the customer (e.g., a phone number of the customer, an Internet Protocol (IP) address of the customer, or a user identifier of the customer). In one embodiment, the keyword is specified by the customer; and the category is specified by the partner.

In one embodiment, the advertisement database is searched for cross selling or pitch switching based on a directory assistance request of the customer; and the search may include filtering out advertisements from a corporation that is mentioned in the directory assistance request, filtering out advertisements that are not in the same level (e.g., economical level, and quality level) as the corporation that is mentioned in the directory assistance request, filtering categories, companies and/or advertisements that are specified by a demand partner (e.g., the directory assistance provider).

In one embodiment, a portion of the advertisement is provided to the customer via a text message (e.g., via a short message service (SMS)), which may include a phone number, a description of an advertisement, an electronic coupon, and/or a link (e.g., a link to an audio component, a video component, an image component, a detailed advertisement web page, etc.).

In one embodiment, the advertisement is identified in the search based at least in part on bid price for communication leads and yield of advertisements.

In one embodiment, the request and/or the response includes an identification of the advertisement.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
   processing, by a web services server, a request according to an application program interface allowing a client application of a demand partner to communicate through the application programming interface with a server application of the web services server over a communication connection, wherein:
   the request is received from the client application of the demand partner on behalf of a customer and the request comprises i) a keyword specified by the customer and ii) a category specified by the client application of the demand partner; and the application programming interface allows the client application of the demand partner to invoke a set of one or more callable methods to access the server application according to a predefined data interface and to retrieve a set of advertisements from an advertisement database hosed on a database server in communication with the web services server;

wherein the processing the request according to the application program interface results in at least one method from the set of one or more callable methods being invoked;

based at least in part at least one method invoked from the set of one or more callable methods, searching, by an advertisement server in communication with the database server, the advertisement database hosted on the database server according to the request to identify an advertisement, wherein searching the advertisement database comprises automatically searching for cross selling and/or pitch switching based on a directory assistance request of the customer and filtering out advertisements according to a parameter specified by the client application;

consequent to the identifying the advertisement, allocating, by a reference allocation server, a real-time communication reference used to communicate with an advertiser to the advertisement; and transmitting, by the web services server to the client application, at least a portion of the advertisement according to the application programming interface, the advertisement including the real-time communication reference used to communicate with the advertiser, wherein the advertiser is billed a predetermined fee for the advertisement in response to an initiation of a communication connected to the advertiser via the real-time communication reference, the communication connected based at least in part on a Voice over Internet Protocol connection.

2. The method of claim 1, wherein the real-time communication reference comprises a phone number.

3. The method of claim 2, wherein the phone number comprises one of a country code, an area code, an extension, and a session initiation protocol uniform resource identifier.

4. The method of claim 1, wherein the request further comprises an identifier associated with the demand partner and an identification representing the customer.

5. The method of claim 4, wherein the identification representing the customer comprises one of a phone number of the customer, an Internet protocol address of the customer, and a user identifier of the customer.

6. The method of claim 1, further comprising:
providing a portion of the advertisement to the customer via a text message.

7. The method of claim 6, wherein the text message is sent via a short message service.

8. The method of claim 6, wherein the portion of the advertisement provided to the customer includes one of a phone number, a description of an advertisement, an electronic coupon, and a link.

9. The method of claim 1, wherein the request further specifies a filter that is based on at least one of content of advertisements, advertisers, economical level, and quality level.

10. The method of claim 1, wherein searching the advertisement database comprises identifying the advertisement based at least in part on the predetermined fee for the advertisement and yield of advertisements.

11. The method of claim 1, wherein the portion of the advertisement includes at least one of a name of the party, a street address of the party, a description of the advertisement, the predetermined fee for the advertisement, a link to an audio component, a link to a video component and a default display of the advertisement.

12. The method of claim 1, wherein the request includes an identification of the advertisement.

13. One or more non-transitory, machine-readable media containing instructions which when executed on a server system cause the server system to perform a method, comprising:

processing, by a web services server, a request according to an application program interface allowing a client application of a demand partner to communicate through the application programming interface with a server application of the web services server over a communication connection, wherein:

the request is received from the client application of the demand partner on behalf of a customer and the request comprises i) a keyword specified by the customer and ii) a category specified by the client application of the demand partner; and the application programming interface allows the client application of the demand partner to invoke a set of one or more callable methods to access the server application according to a predefined data interface and to retrieve a set of advertisements from an advertisement database hosed on a database server in communication with the web services server;

wherein the processing the request according to the application program interface results in at least one method from the set of one or more callable methods being invoked;

based at least in part at least one method invoked from the set of one or more callable methods, searching, by an advertisement server in communication with the database server, the advertisement database hosted on the database server according to the request to identify an advertisement, wherein searching the advertisement database comprises searching for cross selling and/or pitch switching based on a directory assistance request of the customer and filtering out advertisements according to a parameter specified by the client application;

consequent to the identifying the advertisement, allocating, by a reference allocation server, a real-time communication reference used to communicate with an advertiser to the advertisement; and transmitting, by the web services server to the client application, at least a portion of the advertisement according to the application programming interface, the advertisement including the real-time communication reference used to communicate with the advertiser, wherein the advertiser is billed a predetermined fee for the advertisement in response to an initiation of a communication connected to the advertiser via the real-time communication reference, the communication connected based at least in part on a Voice over Internet Protocol connection.

14. A server system, comprising:
a web services server to process a request according to an application program interface allowing a client application of a demand partner to communicate through the application programming interface with a server application of the web services server over a communication connection, wherein:

the request is received from the client application of the demand partner on behalf of a customer and the request comprises i) a keyword specified by the customer and ii) a category specified by the client application of the demand partner; and the application programming interface allows the client application of the demand partner to invoke a set of one or more callable methods to access the server application according to a predefined data interface and to retrieve a set of advertisements from an advertisement database hosed on a database server in communication with the web services server;

wherein the processing the request according to the application program interface results in at least one method from the set of one or more callable methods being invoked;

an advertisement server in communication with the database server to search the advertisement database hosed on the database server, based at least in part at least one method invoked from the set of one or more callable methods, a searching means for searching an advertisement database according to the request to identify an advertisement, wherein searching the advertisement database comprises searching for cross selling and/or pitch switching based on a directory assistance request of the customer and filtering out advertisements according to a parameter specified by the client application; and a reference allocation server to allocate a real-time communication reference used to communicate with an advertiser to the advertisement, consequent to the identifying the advertisement;

the web services server to transmit to the client application at least a portion of the advertisement according to the application programming interface in response to the request, the advertisement including the real-time communication reference used to communicate with the advertiser, wherein the advertiser is billed a predetermined fee for the advertisement in response to an initiation of a communication connected to the advertiser via the real-time communication reference, the communication connected based at least in part on a Voice over Internet Protocol connection.

* * * * *